United States Patent
Hotta et al.

(10) Patent No.: US 7,604,250 B2
(45) Date of Patent: Oct. 20, 2009

(54) AIRBAG DEVICE

(75) Inventors: Naoki Hotta, Aichi-ken (JP); Atsushi Nagata, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 398 days.

(21) Appl. No.: 11/434,563

(22) Filed: May 16, 2006

(65) Prior Publication Data

US 2006/0279073 A1  Dec. 14, 2006

(30) Foreign Application Priority Data

| May 18, 2005 | (JP) | ............................ 2005-145643 |
| May 18, 2005 | (JP) | ............................ 2005-145650 |
| May 18, 2005 | (JP) | ............................ 2005-145661 |

(51) Int. Cl.
 *B60R 21/016* (2006.01)
(52) U.S. Cl. ..................... 280/728.2; 280/740; 280/752
(58) Field of Classification Search ............. 280/728.2, 280/730.1, 752, 753, 740
See application file for complete search history.

(56) References Cited

U.S. PATENT DOCUMENTS

| 4,004,827 A | 1/1977 | Kondo et al. |
| 5,150,919 A | 9/1992 | Sakakida et al. |
| 5,230,530 A | 7/1993 | Iriyama et al. |
| 5,356,174 A | 10/1994 | Rhein et al. |
| 5,364,124 A | 11/1994 | Donegan et al. |
| 5,489,116 A | 2/1996 | Boag |
| 5,820,157 A | 10/1998 | Matsumoto |
| 5,836,607 A | 11/1998 | Wallner |
| 6,135,495 A | 10/2000 | Redgrave et al. |
| 6,435,548 B2 | 8/2002 | Suzuki et al. |
| 6,837,513 B2 * | 1/2005 | Oka et al. ................ 280/728.2 |

(Continued)

FOREIGN PATENT DOCUMENTS

DE  690 04 426  5/1994

(Continued)

OTHER PUBLICATIONS

Office Action dated Nov. 2, 2007 in corresponding Chinese Patent Application No. 20010078254.0 (and English translation).

(Continued)

*Primary Examiner*—Paul N. Dickson
*Assistant Examiner*—Timothy Wilhelm
(74) *Attorney, Agent, or Firm*—Posz Law Group, PLC

(57) ABSTRACT

In an airbag device of the invention, by making use of a retainer which is made up of a retaining part which is provided on an outside of an inflator and bolt parts, an airbag and the inflator are fixed to a fixing wall portion of a case by fastening nuts onto the bolt parts which are caused to protrude from the fixing wall portion of the case in such a state the retaining part is housed within the airbag. A support projection is formed on the fixing wall portion in such a manner as to protrude therefrom toward the inflator side. When the nuts are fastened, the retainer moves the retaining part toward the fixing wall portion side, so that the inflator is held between and retained by abutment portions formed on the retaining part and the support projection.

15 Claims, 15 Drawing Sheets

U.S. PATENT DOCUMENTS

| | | | |
|---|---|---|---|
| 6,902,186 B2 * | 6/2005 | Suzuki et al. | 280/730.1 |
| 2003/0141705 A1 * | 7/2003 | Oka et al. | 280/728.2 |
| 2003/0184069 A1 * | 10/2003 | Takimoto et al. | 280/743.1 |
| 2004/0207183 A1 | 10/2004 | Nagata et al. | |
| 2005/0073134 A1 * | 4/2005 | Matsuura et al. | 280/730.1 |

FOREIGN PATENT DOCUMENTS

| | | |
|---|---|---|
| DE | 196 49 197 | 6/1997 |
| DE | 103 60 509 | 7/2004 |
| JP | A-2003-118528 | 4/2003 |
| JP | A-2003-205814 | 7/2003 |
| JP | A-2003-267178 | 9/2003 |
| JP | A-2004-050932 | 2/2004 |
| JP | A-2005-104269 | 4/2005 |
| JP | A-2005-225427 | 8/2005 |
| JP | A-2005-263153 | 9/2005 |

OTHER PUBLICATIONS

Office Action dated Jun. 12, 2008 in corresponding German Patent Application No. 10 2006 023 203.8-56 (and English translation).
Office Action dated Oct. 23, 2008 in corresponding Indian patent application No. 1216/DEL/2006 (and English translation).

* cited by examiner

ENLARGED VIEW OF NUT FASTENED PORTION

RIGHTWARD ←            → LEFTWARD

ENLARGED VIEW OF OPENSLIT PORTION

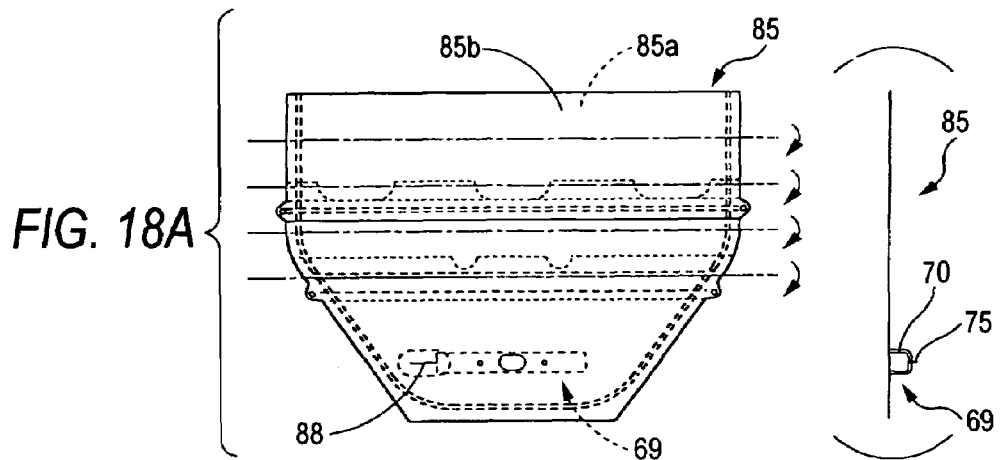
FIG. 18A
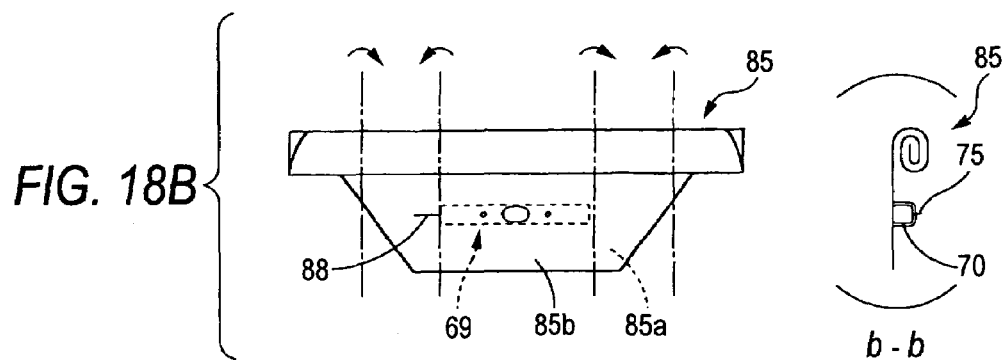
FIG. 18B
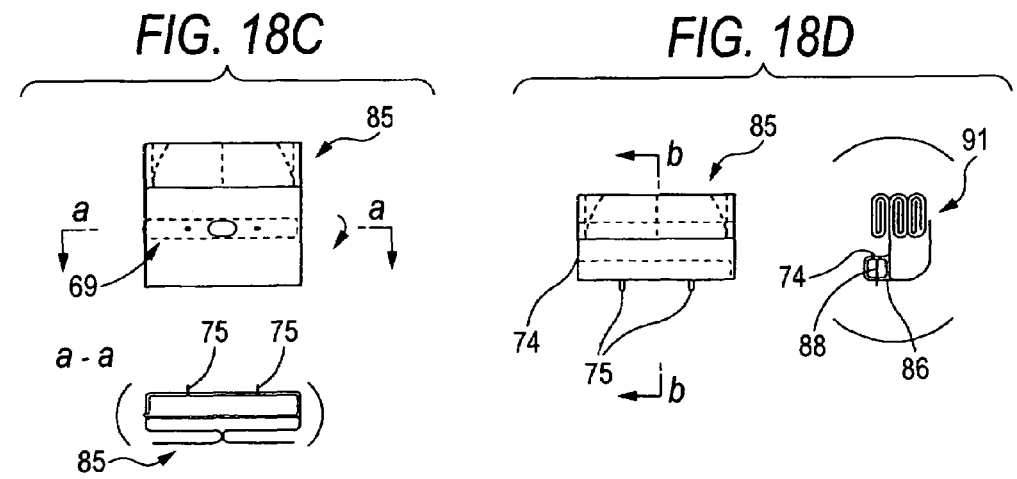
FIG. 18C
FIG. 18D

AIRBAG DEVICE

BACKGROUND OF THE INVENTION

1. Field of the Invention

The present invention relates to an airbag device in which bolt parts of a retainer which is caused to retain an inflator by clamping and are caused to protrude from a case through an airbag, so that nuts are fastened thereonto to thereby fix the inflator and the airbag to the case by making use of the retainer.

2. Related Art

Conventionally, in the airbag device that is configured as has been described above, the inflator, which is formed into a cylinder shape, is retained by the retainer, which is formed into a cylindrical shape, by clamping a plurality of clamping portions which are provided at a plurality of locations lying around the circumference of the retainer such that the inflator is housed in the interior of the retainer, and thereafter, the retainer is housed within the airbag such that bolt parts are caused to protrude therefrom. Furthermore, the airbag is housed within the case with the bolt parts caused to protrude from a fixing wall portion of the case, so that nuts are fastened onto the bolt parts to thereby fix the inflator and the airbag to the case (refer to, for example, JP-2003-205814).

In the conventional airbag device, however, the clamping work is necessary for the retainer to retain the inflator, leading to an increase in the number of manhours for assembling the airbag device.

Normally, since the inflator includes an igniter which ignites a gas generating agent which is filled in an interior thereof, needing to be handled within a facility satisfying the fire-safety standards, there has been a demand for a construction for this type of knee protection airbag device in which an airbag which is folded with only a retainer housed therein is housed in a case in advance, and thereafter, an inflator is mounted on the case, rather than housing an airbag which is folded with a retainer which is provided on an outside of an inflator housed therein in the case together with the inflator.

Further, in another conventional knee protection airbag device, the nut is fastened onto the bolt part which protrudes from a bottom wall portion of the case which is formed into a bottomed box shape which is opened on a rear side thereof, so as to fix the inflator to the case. This inflator is fixed to the case such that a connector side end portion thereof protrudes from a passage hole formed in a circumferential wall portion of the case. In addition, the inflator is circumferentially held to thereby be retained by the retainer by clamping a plurality of clamping portions provided at a plurality of locations lying along a circumferential direction of the retainer such that the inflator is housed in an interior of the retainer from one end thereof where a gas discharge port is provided (refer to, for example, JP-2004-50932).

In such the conventional knee protection airbag device, however, since the inflator is held and retained by the retainer on an outer circumferential surface thereof with an end face of the other end thereof to which the connector is connected not retained, when inflation gas is discharged from the gas discharge port provided at the one end of the inflator, with an intention to increase the output, there is caused a risk where the inflator moves along an axial direction thereof in such a manner that a portion thereof which lies to the end where the connector is connected largely protrudes to the outside of the case from the passage hole, and there still remains a room for improvement in suppression of the movement of the inflator.

SUMMARY OF THE INVENTION

The invention was made to solve the aforesaid problem and an object thereof is to provide an airbag device which can enable the retainer to retain the inflator while obviating the necessity of performing the clamping work, so as to reduce the number of assembling manhours.

The invention is also directed to provide a knee protection airbag device which can stably retain the inflator even when inflation gas is discharged.

The invention is also directed to provide a knee protection airbag device in which the inflator can be mounted on the case after the folded airbag has been housed in the case and which can provide good workability in mounting the inflator.

With a view to accomplishing the object, according to the invention, there is provided an airbag device comprising:

an folded airbag;

an inflator having a substantially cylinder shape for supplying a gas to the airbag;

a case made of a sheet metal in which the airbag and the inflator are housed; and a retainer made of a sheet metal including a retaining part having a substantially cylindrical shape in which the inflator is provided and a bolt part protruding perpendicularly to an axial direction of the retaining part;

wherein the inflator and the retainer are housed in the airbag such that the bolt part protrudes from the airbag and passes through a passage hole on a fixing wall portion of the case, a nut is fastened onto the bolt part to thereby fix the airbag and the inflator to the fixing wall portion, a support projection protruding toward the inflator is formed on the fixing wall portion at a position deviated in an axial direction of the inflator from the passage hole, and wherein when the retaining part is moved toward the fixing wall portion by fastening the nut, the inflator is fixed to the fixing wall portion while clamping a part of the inflator between an abutment portion of the retaining part and the support projection.

In the airbag device of the invention, the inflator can be retained by the retainer at the same time as the nuts are fastened to fix the airbag and the retainer to the fixing wall portion of the case, whereby the clamping work on the inflator with the retainer, which is necessary in the conventional example, can be omitted. As a result, the number of manhours for assembling the airbag device can be reduced.

Consequently, in the airbag device of the invention, it is possible to reduce the number of assembling manhours.

In addition, in the airbag device of the invention, since the inflator is retained by the retainer at the same time as the retainer is fixed to the case, the airbag device can be built up by housing the airbag that is folded with only the retainer housed in the interior thereof within the case and thereafter inserting the inflator into the retainer through a passage hole that has been formed in the airbag in advance. Namely, according to the airbag device of the invention, since a configuration can be adopted in which the inflator is built in at a final step of the assembly process, it is also possible to firstly assemble the airbag which incorporates therein the retainer and the case together as an assembly and to build only the inflator into the assembly thereafter at different site.

Furthermore, in the airbag device of the invention, in the event that a pair of the abutment portions are formed along a circumference of the retaining part in a cross section perpendicular to an axial direction of the retaining part, such that the abutment portions are opposed to the bolt part, the inflator can be supported by the abutment portions and the support projection at three points which lie along a circumferential direction thereof, the inflator can preferably be retained stably.

Moreover, in the airbag device that is configured as has been described above, in the event that a pair of the bolt parts are provided along the axial direction of the retaining part, and the support projection is provided so as to be located between a pair of the passage holes on the fixing wall portion, during the assembly of the airbag device, when the airbag which is folded with only the retainer housed in the interior thereof is housed within the case, since the retainer is stabilized in position relative to the airbag by the two bolt parts thereof which are passed through the airbag, the bolt parts can preferably be made easily to protrude from the fixing wall portion.

According to the invention, there is provided an airbag device comprising:

an folded airbag;

an inflator of a substantially cylinder shape, having a gas discharge port provided at a first end thereof for supplying a gas to the airbag and a part to which a connector connected to an airbag activation circuit through a lead wire is connected at a second end thereof, wherein the inflator is housed within the case such that a bolt part provided on a retainer passes through a fixing wall portion of the case and the second end of the inflator protrudes from a passage hole formed in the case and then the inflator is fixed to the case with the retainer when a nut is fastened onto the bolt part;

a case made of a sheet metal in which the airbag and the inflator are housed; and a dislodgement preventing member is provided on an outer side of the case for securing the second end of the inflator protruding from the passage hole so as to prevent a dislodgement of the inflator from the case, the dislodgement preventing member including:

a securing plate portion which extends perpendicularly to an axial direction of the inflator for securing the second end of the inflator and which includes an opening through which the connector is connected to the inflator, and a fixing portion continuous from the securing plate portion extending along the axial direction of the inflator for being tightened to be fixed to the case when the nut is fastened onto the bolt part; and a locking hook provided on the securing plate portion for being locked on the case so as to suppress a movement of the securing plate portion in the axial direction of the inflator.

In the airbag device of the invention, that is suitable for knee protection airbag device, even though the inflator attempts to move along the axial direction in such a manner that the connector side end portion protrudes from the passage hole when inflation gas is discharged, since the connector side end portion of the inflator is secured by the securing plate portion of the dislodgement preventing member which is provided so as to intersect the axial direction of the inflator substantially at right angles, the axial movement of the inflator is restricted by the securing plate portion. Due to this, even with the configuration in which the inflator is held and retained by the retainer on the outer circumferential surface thereof, it is possible to restrain the inflator from moving along the axial direction to thereby protrude from the case when inflation gas is discharged.

Consequently, according to the knee protection airbag device of the invention, the inflator can be retained stably, even when inflation gas is discharged.

In addition, in the knee protection airbag device of the invention, since the dislodgement preventing member is fixed to the case by the locking hook and the fixing portion which is tightened together when the nut is fastened onto the bolt part of the retainer to thereby be fixed to the case, the dislodgement preventing member can be fixed to the case at the same time as a nut tightening operation is performed to fix the retainer to the case, thereby making it possible to suppress an increase in the number of manhours for assembling the airbag device.

Furthermore, in the knee protection airbag device of the invention, the dislodgement preventing member is preferably formed from sheet metal, and the locking hook is preferably inserted into a passage hole provided at a location on a circumferential edge of the passage hole so as to be locked on a circumferential edge of the passage hole such that the locking hook is brought into press contact with a wall portion on an inner surface of the case which lies on the circumferential edge of the passage hole.

In the knee protection airbag device that is configured as has been described above, the locking hook is brought into press contact with the wall portion of the case which lies on the circumferential edge of the passage hole, the generation of abnormal noise can be suppressed which would otherwise be triggered by the locking hook which is vibrated against the case when the vehicle is running.

According to the invention, there is provided an airbag device comprising:

an folded airbag;

an inflator having a substantially cylinder shape for supplying a gas to the airbag;

a case made of a sheet metal in which the airbag and the inflator are housed; and a retainer made of a sheet metal including a retaining part having a substantially cylindrical shape in which the inflator is provided and a bolt part protruding perpendicularly to an axial direction of the retaining part;

wherein the airbag is folded to house the retainer that is inserted through an insertion hole on the airbag and a passage hole on the case, and wherein a locking claw portion protruded at an axial end of the retaining part is locked at a circumferential edge of the insertion hole of the air bag when the airbag is housed within the case to thereby substantially align a center axis of the inflator insertion opening of the retainer part with a center axis of the insertion hole.

In the airbag device of the invention, that is suitable for knee protection airbag device, the inflator can be inserted into the interior of the retaining part in a smooth fashion.

Consequently, according to the knee protection airbag device of the invention, the inflator can be mounted on the case after the folded airbag has been housed within the case, and good workability in mounting the inflator is provided.

In addition, in the invention, in the event that the locking claw portion is provided at a position which is substantially symmetrical with the bolt part with respect to an opening center of the insertion hole which functions as the center of the point symmetry such that the locking claw portion is projected on to an open plane of the insertion hole when the retainer is housed within the airbag in such a manner that the bolt part protrudes therefrom, the insertion hole is retained by the locking claw portion and the bolt part at two positions which are symmetrical with each other with respect to the opening center which functions as the center of the point symmetry, and therefore, even though the inflator hits the circumferential edge of the insertion hole when the inflator is inserted, the circumferential edge of the insertion hole is made hard to deviate, whereby the opening center of the insertion hole and the center of the inflator inserting opening of the retaining part can be aligned with each other, so that the inflator can be inserted into the interior of the retaining part more smoothly.

Another aspect of the invention provides a method of assembling an airbag device including an folded airbag, an inflator having a substantially cylinder shape for supplying a gas to the airbag, and a case made of a sheet metal in which the airbag and the inflator are housed, and a retainer made of a sheet metal including a retaining part having a substantially cylindrical shape in which the inflator is provided and a bolt part protruding perpendicularly to an axial direction of the retaining part, comprising the steps of:

housing the retainer in the airbag such that the bolt part protrudes from the airbag;

housing the airbag into the case;

passing the bolt part through a passage hole formed on a fixing wall portion of the case; and fastening a nut onto the bolt part to fix the retainer to the fixing wall portion, wherein the inflator is retained by the retainer substantially at the same time as the retainer is fixed to the fixing wall portion.

According to the above method of assembling an airbag device, it is possible to suppress an increase in the number of manhours for assembling the airbag device.

In addition, in the above method, it is preferable that a support projection is formed on the fixing wall portion at a position deviated in an axial direction of the inflator from the passage hole, so as to protrude from the fixing wall portion toward a side of the inflator, and the inflator is fixed to the fixing wall portion while clamping a part of the inflator between an abutment portion of the retaining part and the support projection by fastening the nut.

Also, in the above method, it is preferable that a gas discharge port from which gas is dischargeable is provided at a first end of the inflator, and a connector connecting to an airbag activation circuit through a lead wire is mounted at a second end of the inflator, a dislodgement preventing member is provided on an outer side of the case which secures the second end of the inflator to prevent a dislodgement of the inflator from the case, the inflator is inserted into the case such that the second end of the inflator protrudes from a passage hole formed in the case, the second end of the inflator is fixed to the case through the retainer, when the nut is fastened onto the bolt part, and a securing plate portion of the dislodgement preventing member is secured to the second end of the inflator so as to suppress a movement of the securing plate portion along the axial direction of the inflator and such that the connector is connected to the inflator so that the lead wire passes an opening by inserting a locking hook formed on the securing plate portion on a passage hole on a side of the retainer, and by securing a fixing portion of the dislodgement preventing member that is continuous from the securing plate portion to the case by fastening the nut onto the bolt part.

Also, it is preferable that an insertion hole is formed on the airbag so as to allow to insert the inflator therein, the inflator is inserted from the insertion hole through the passage hole in the case into the airbag that is folded such that the retaining part of the retainer is housed therein, and a locking claw portion protruded at an axial end of the retaining part is locked at a circumferential edge of the insertion hole when the airbag is housed within the case to thereby substantially align a center axis of the inflator insertion opening of the retaining part with a center axis of the insertion hole.

BRIEF DESCRIPTION OF THE DRAWINGS

FIGS. 18A to 18D are schematic drawings which show a folding process of the airbag used in the embodiment.

DETAILED DESCRIPTION OF THE PREFERRED EMBODIMENTS

Hereinafter, an embodiment of the invention will be described based on the accompanying drawings. Note that while in this embodiment, a knee protection airbag device S is taken as an example for description, airbag devices to which the invention can be applied are not limited thereto, and hence, the invention can be applied to other types of airbag devices such as a side airbag device.

Figure 1:
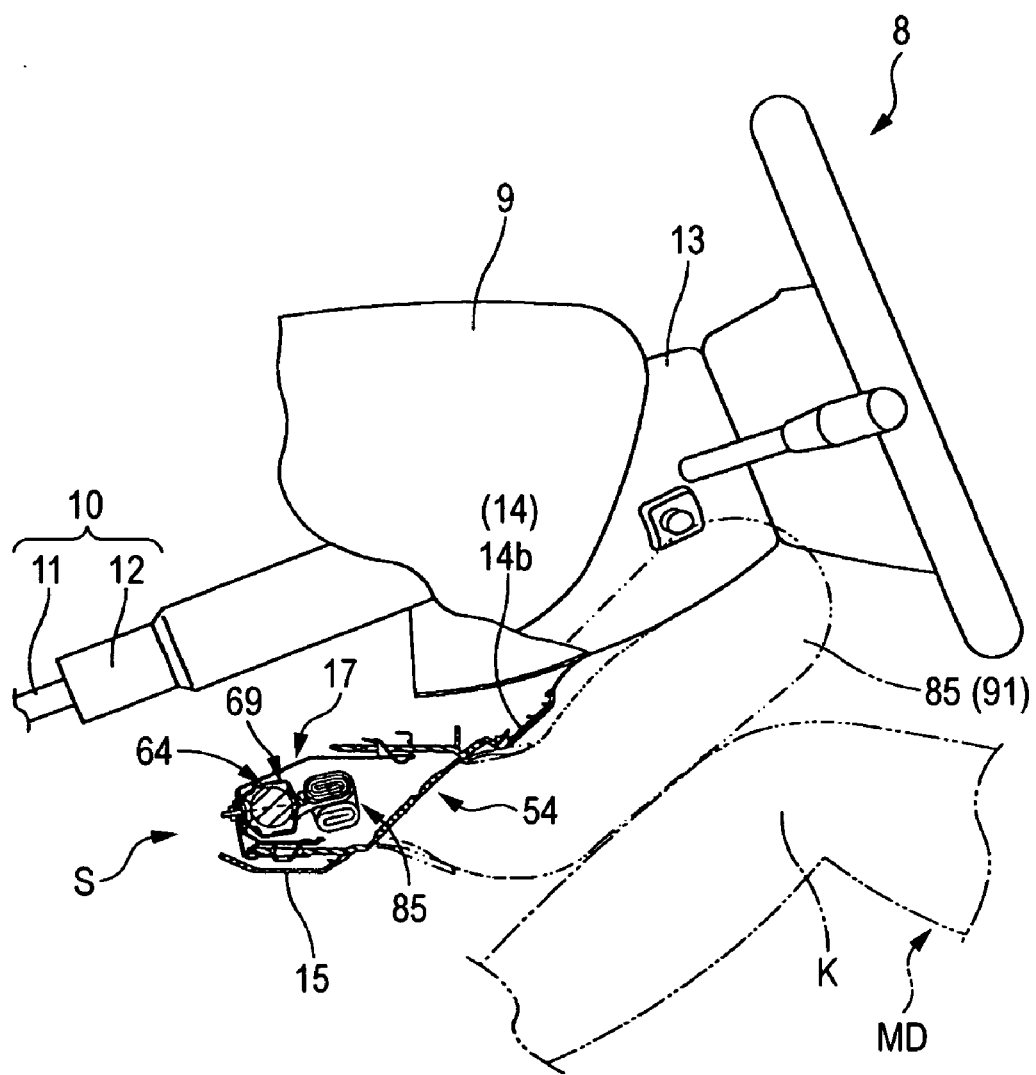
FIG. 1 is a schematic longitudinal vertical cross-sectional view of a knee protection airbag device according to an embodiment of the invention which shows how to be used.
Figure 2:
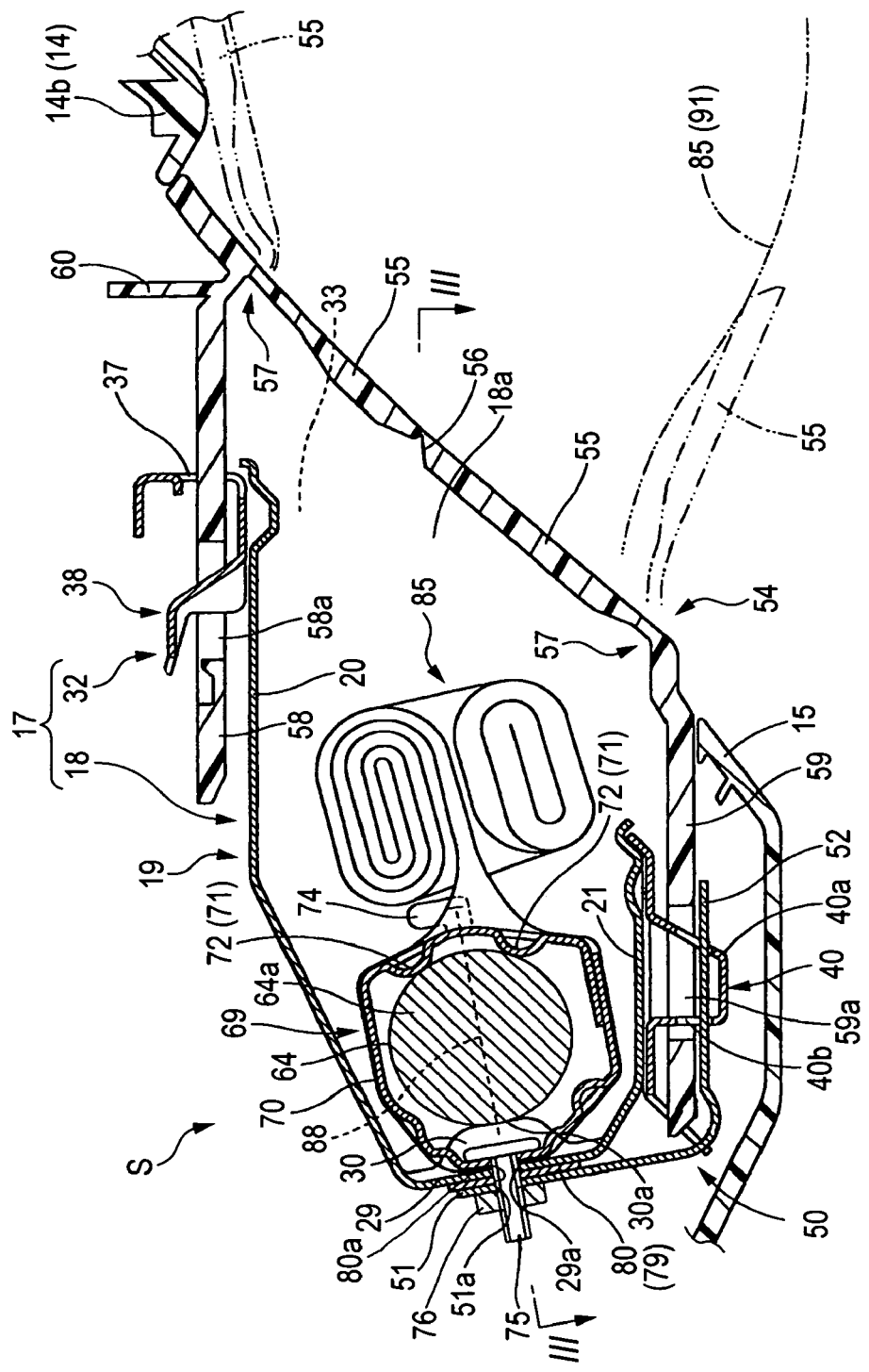
FIG. 2 is a schematic longitudinal enlarged cross-sectional view of the knee protection airbag device according to the embodiment.
Figure 4:
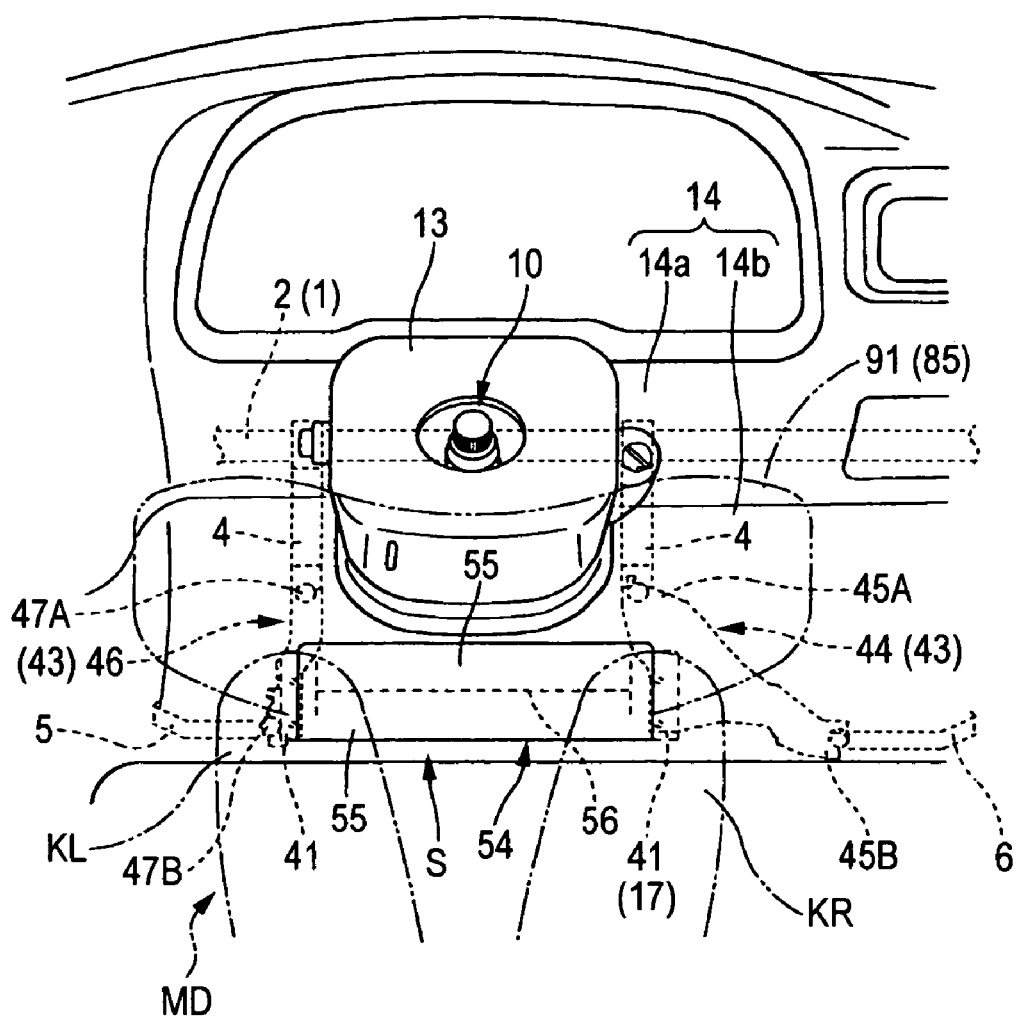
FIG. 4 is a schematic front view of the knee protection airbag device of the embodiment resulting when viewed from the rear which shows how to be used.

As shown in FIGS. 1, 4, a knee protection airbag device S according to the embodiment is provided below a steering column 9 in front of a driver MD as an occupant who faces the front of a vehicle so as to protect the knees (KL, KR) of the driver MD. Note that when used in this specification, words such as up/upward, down/downward and vertical/vertically, left/leftward, right/rightward and transverse/transversely, and front/forward, rear/rearward, and longitudinal/longitudinally denote directions corresponding to those defined as up/upward, down/downward and vertical/vertically, left/leftward, right/rightward and transverse/transversely, and front/forward, rear/rearward and longitudinal/longitudinally of the vehicle, respectively, when the knee protection airbag device S is installed on the vehicle.

As shown in FIG. 1, the steering column 9 is made up of a column main body 10 and a column cover 13. The column main body 10 is made up of a main shaft 11 and a column tube 12 which covers the circumference of the main shaft 11.

The knee protection airbag device S is made up of an airbag 85 which is folded, an inflator 64 which supplies an inflation gas to the airbag 85, a retainer 69 which is provided on an outside of the inflator 64 so as to retain the inflator 64 by clamping, a case 17 which houses therein the folded airbag 85 and the inflator 64 and which is opened on a rear side thereof, a dislodgement preventing member 79 which is provided in such a manner as to secure an end portion 64e of the inflator 64 which protrudes from the case 17, a knee panel 43 via which the case 17 is fixedly mounted on a body 1 side of the vehicle, and an airbag cover 54 which covers a rear side of an opening 18a in the case 17.

As shown in FIGS. 1 to 4, the case 17 is made from sheet metal and is provided on a lower side of the steering column 9. The case 17 is made up of a box-shaped main body portion 18 and a mounting member 32 which is provided on a circumferential edge of the opening 18a of the main body portion 18 and via which the airbag cover 54 is mounted on the case 17.

The main body portion 18 is made up of a circumferential wall portion 19 which is formed into a substantially quadrangular cylindrical shape and a bottom wall portion 29 which functions as a fixing wall portion which closes a front side of the circumferential wall portion 19 and includes the opening 18a, which is formed into a substantially rectangular shape and is provided on a rear side thereof.

Figure 8A:
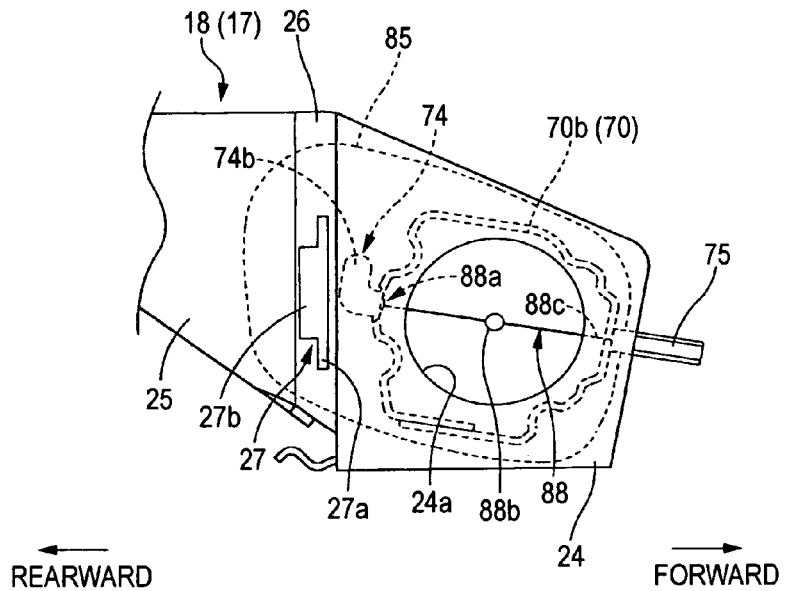
FIG. 8A is a partially enlarged side view of a case showing a state in which an airbag which is folded with the retainer housed therein is housed within the case, which side view results when viewed from the right.
Figure 9:
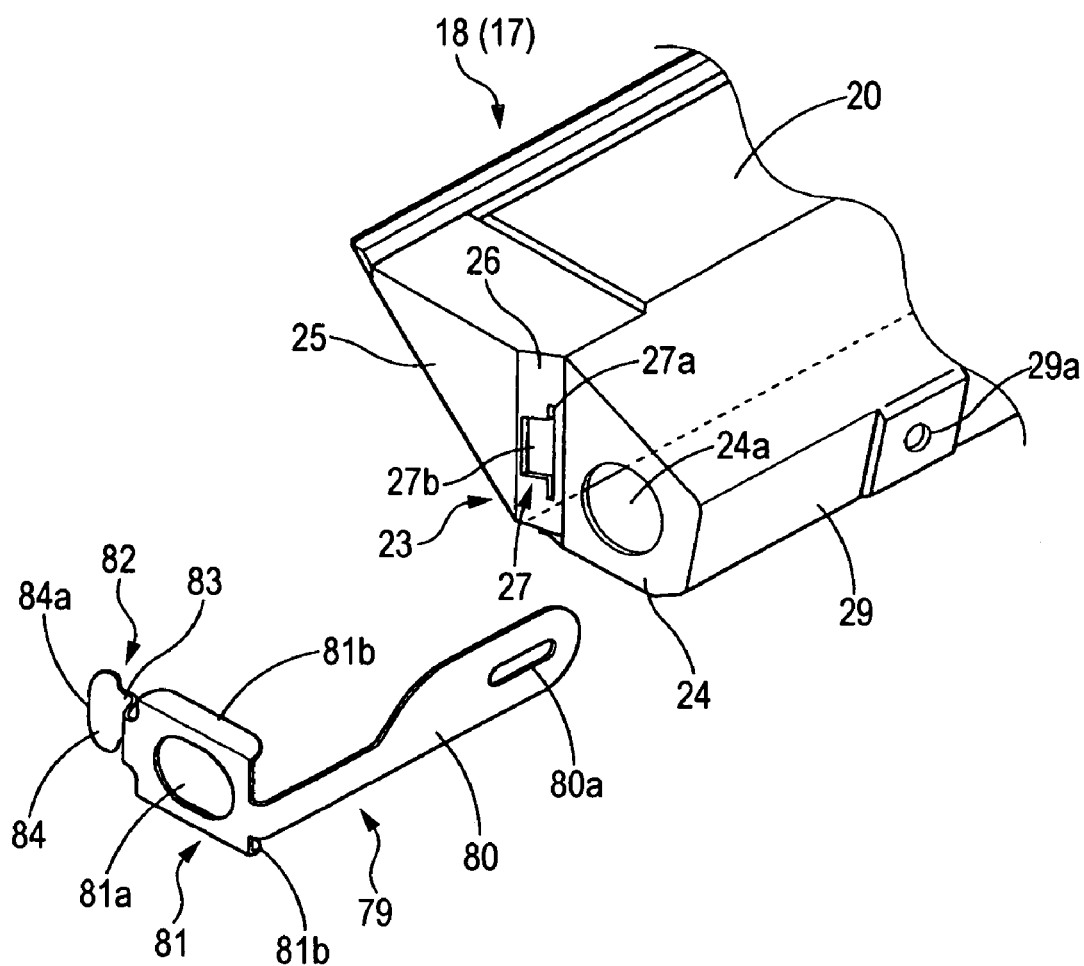
FIG. 9 is an exploded perspective view which shows a main body portion of the case and a dislodgement preventing member which are used in the embodiment.
Figure 14:
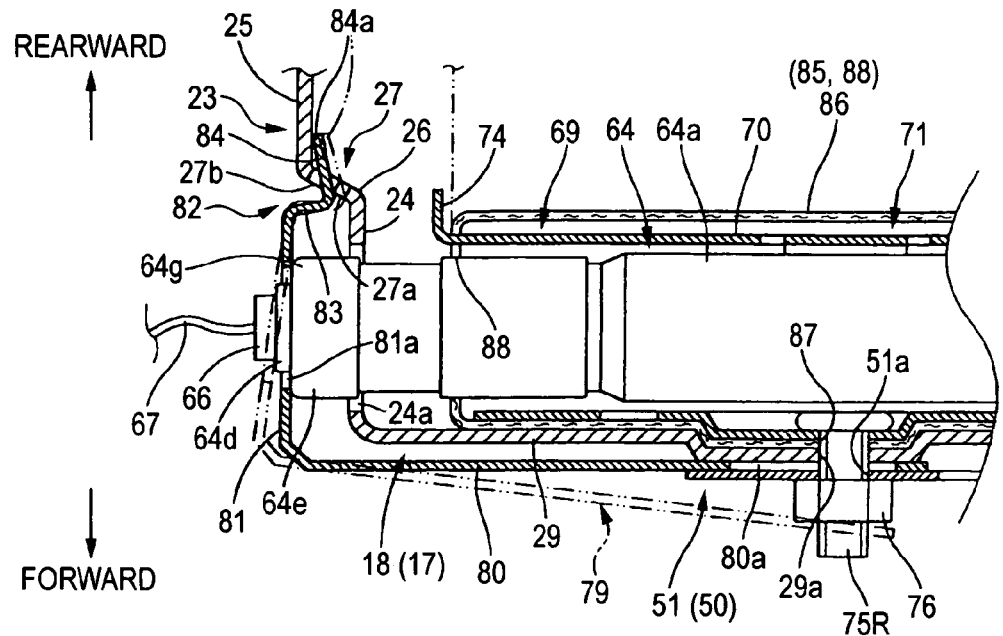
FIG. 14 is a partially enlarged sectional view of the knee protection airbag device of the embodiment showing the vicinity of the dislodgement preventing member, which sectional view constitutes a horizontal sectional view of the system.

The circumferential wall portion 19 is made up of upper and lower wall portions 20, 21 which face vertically and left and right wall portions 22, 23 which face transversely. In a horizontal sectional view, the right wall portion 23 has an inclined wall portion 26 which is provided between a front proximal wall portion 24 and a rear distal wall portion 25, which are provided substantially along a longitudinal direction, and formed into a stepped shape by inclining the inclined wall portion 26 in such a manner as to be expanded transversely at an end thereof which lies to the distal wall portion 25 (refer to FIGS. 3, 9, 14). A passage hole 24a is formed in the proximal wall portion 24 through which the inflator 64 can be passed into the main body portion 18. A dislodgement preventing member 79, which will be described later on, is provided on an outer side of the case main body portion 18 for securing an end portion 64e of the inflator 64 which remains protruding from the passage hole 24a. In addition, a passage hole 27 is formed at a location on the inclined wall portion 26 which constitutes part of a circumferential edge of the passage hole 24a so as to allow the passage of a locking hook 82, which will be described later on, of the dislodgement preventing member 79. As shown in FIGS. 8A, 9, the passage hole 27 is formed into a turned substantially T-shape in which the width of a side which lies to the proximal wall portion 24 is widened and is made up of a wider portion 27a which allows the passage of a head portion 84 of the locking hook 82 and a narrower portion 27b which allows the passage of only a neck portion 83 of the locking hook 82, whereby the head portion 84 of the locking hook 82 is locked on a circumferential edge of the narrower portion 27b. In addition, when the dislodgement preventing member 79 is disposed, a distal end 84a of the head portion 84 of the locking hook 82 is designed to be brought into press contact with the distal wall portion 25 from an inside thereof, so that the head portion 84 of the locking hook 82, which is locked on the circumferential edge of the narrower portion 27b, is designed to be brought into press contact with an inner surface of the distal wall portion 25 at a distal end 84a thereof.

The bottom wall portion 29 is such as to function as the fixing wall portion to which the airbag 85 and the inflator 64 are fixed and includes passage holes 29a which allow the passage of bolt parts 75 provided on the retainer 69. The passage holes 29a are provided in parallel at two locations which lie along a transverse direction (an axial direction of the inflator 64) so as to correspond to the bolt parts 75, respectively. In addition, a support projection 30 is formed on the bottom wall portion 29 at a position between the passage holes 29a, 29a deviated transversely (axially of the inflator 64) from positions where the passage holes 29a are formed in such a manner as to protrude to an inner circumferential side (to the inflator 64 side) substantially along a direction in which the bolt parts 75 protrude. This support projection 30 is such as to be formed into a frustum-like shape and is made to support the inflator 64 by bringing a substantially flat distal end portion 30a thereof into abutment with a large-diameter portion 64a, which will be described later on, of the inflator 64. Thus, the retainer 69 is able to hold the inflator 64 by making use of the flat distal end portion 30a, when installed on the vehicle.

Figure 5:
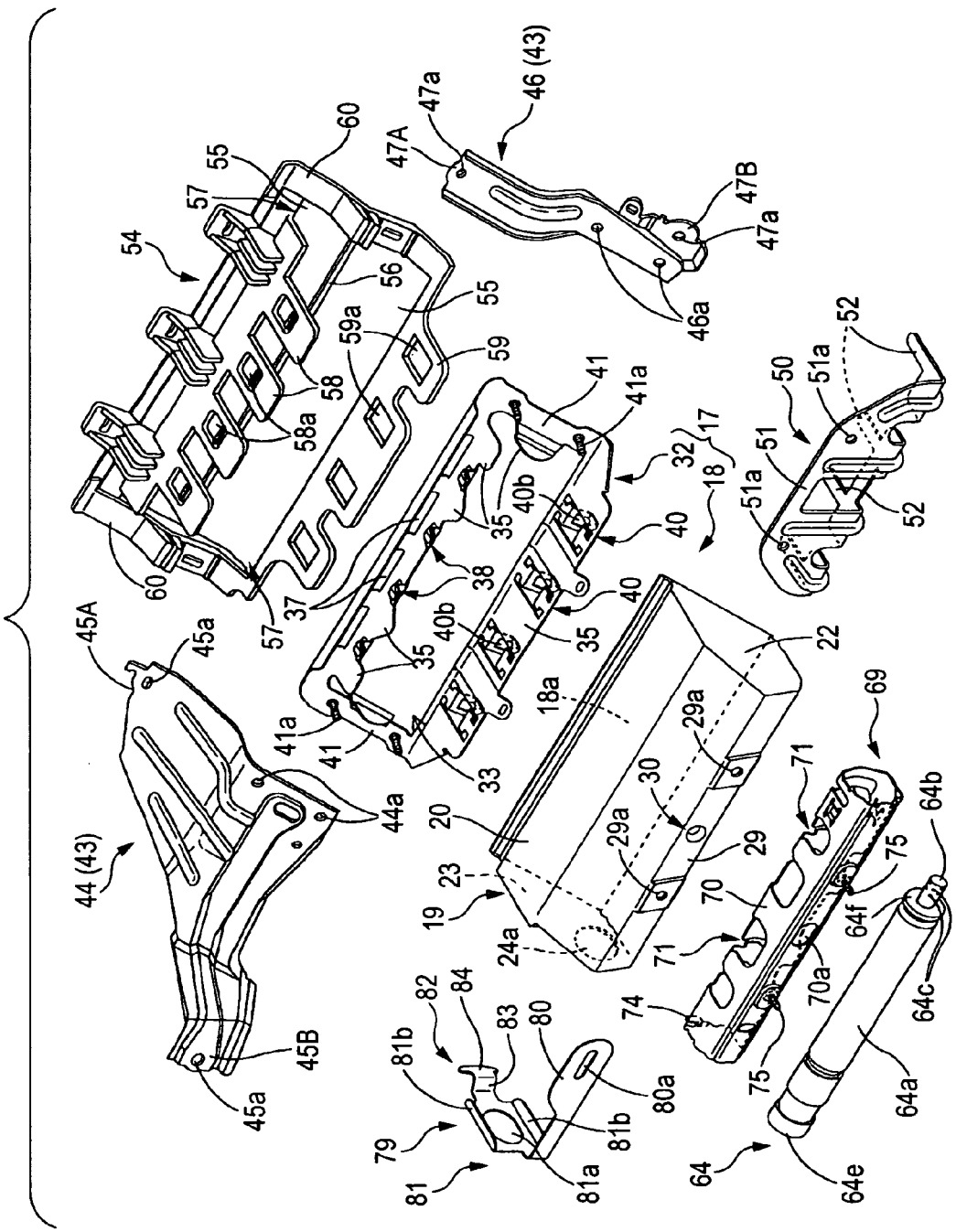
FIG. 5 is an exploded perspective view resulting when viewed from the front which shows case, airbag cover, knee panels, inflator, retainer, securing member and dislodgement preventing member which are used in the embodiment.

The mounting member 32 is, as shown in FIG. 5, such as to be separated from the main body portion 18 and includes a snug-fit passage hole 33 through which a circumferential edge portion of the opening 18a in the circumferential wall portion 19 of the main body portion 18 snugly passes. In addition, securing portion 35 is provided along substantially the full circumference of a circumferential edge of the snug-fit passage hole 33 in such a manner as to protrude forward therefrom to thereby be secured to an outer surface of the main body portion 18 which lies in the vicinity of the opening 18a, whereby the mounting member 32 is integrated with the main body portion 18 by causing this securing portion 35 to be secured to the circumferential wall portion 19. Additionally, a plurality (four in this embodiment) of through holes 37, which are each opened into a substantially rectangular shape, are provided transversely in the mounting member 32 at locations which lie in the vicinity of an upper side of the snug-fit passage hole 33 in such a manner as to penetrate the mounting member 32 from front to rear (or longitudinally). These through holes 37 are such as to allow the passage of attachment piece portions 58, which will be described later on, of the airbag cover 54 and are provided at positions which are near to and superposed in the longitudinal direction on locking claw portions 38a, respectively, to which the corresponding attachment piece portions 58 are attached.

The locking claw portions 38 and locking projections 40 are provided on the securing portion 35 at portions which are located in the vicinity of the upper and lower wall portions 20, 21 of the main body portion 18, respectively, in such a manner as to extend. The locking claw portions 38 are such as to be provided on the upper wall portion 20 side and are provided in a plural number (four in this embodiment) along the transverse direction. Each locking claw portion 38 protrudes upward from the upper wall portion 20 and is bent forward at a distal end thereof to thereby be formed into substantially an L-shape in cross section, so as to be inserted into a locking hole portion 58a, which will be described later on, of the attachment piece portion 58 to lock a circumferential edge of the locking hole portion 58a. The locking projections 40 are such as to be provided on the lower wall portion 21 side and are provided in a plural number (four in this embodiment) along the transverse direction in such a manner as to protrude downward from the lower wall portion 21 individually. Each locking projection 40 is such as to be passed through a locking hole portion 59a formed in an attachment wall portion 59, which will be described later on, of the airbag cover 54 and is attached to the locking hole portion 59a by a securing member 50 which is a separate element from the case 17. Each locking projection 40 includes a protruding portion 40a which protrudes downward from the attachment wall portion 59 when attached, and an insertion hole 40b is formed in the protruding portion 40a in such a manner as to penetrate the protruding portion 40a in the longitudinal direction so that an inserting portion 52 of the securing member 50 can be inserted thereinto.

The securing member 50 is formed from sheet metal and is made up of a fixing portion 51 which is provided to extend substantially along a vertical direction and comb tooth-like inserting portions 52 which are provided longitudinally in such a manner as to extend rearward from a lower edge side of the fixing portion 51. In the event of this embodiment, the inserting portions 52 are provided four in parallel along the transverse direction in such a manner as to correspond to the locking projections 40, respectively. Two passage holes 51a are formed in the fixing portion 51 which allow the passage of the bolt parts 75 of the retainer 69. In addition, the securing member 50 is made to prevent the dislodgement of the locking projections 40 from the locking hole portions 59a, respectively, by causing the inserting portions 52 to be inserted into the insertion holes 40b formed in the respective protruding portions 40a of the locking projections 40 which protrude downward from the attachment wall portion 59 so that the inserting portions 52 are each provided to function as a latch. The securing member 50 comes to be fixed to the case main body portion 18 together with the retainer 69 using the bolt parts 75 via which the retainer 69 is allowed to be fixed to the case 17 and nuts 76.

Left and right sides of the snug-fit passage hole 33 of the mounting member 32 are made to function as fixing portions 41 via which the case 17 is fixed to the knee panel 43. The fixing portions 41 are each such as to be provided in an inclined fashion along an open plane of the case opening 18a with a rear side and a front side thereof positioned upward and downward, respectively, and each have two bolts 41a which are provided along a vertical direction of an open plane of the snug-fit passage hole 33 in such a manner as to protrude forward.

In the event of this embodiment, the knee panel 43 is made up of a right panel portion 44 which is provided on a right-hand side of the case 17 and a left panel portion 46 which is provided on a left-hand side of the case 17. The right panel portion 44 is formed into something like a substantially triangular plate which is fixed to the fixing portion 41 at a portion which lies in the vicinity of a left lower end portion thereof and has at an upper end portion and a right end portion thereof mounting portions 45 (45A, 45B) which are mounted on the body 1 side. A mounting hole 45a is formed in each mounting portion 45 via which the mounting portion 45 is bolted to the body 1 side. The left panel portion 46 is formed into something like a substantially rectangular plate which is provided substantially along the longitudinal direction and is made to be fixed to the fixing portion 41 at a portion which lies in the vicinity of a lower end thereof, having at both upper and lower end portions thereof mounting portions 47 (47A, 47B) which are mounted on the body 1 side. A mounting hole 47a is formed in each mounting portion 47 via which the mounting portion 47 is bolted to body 1 side. The left and right panel portions 44, 46 are each provided in an inclined fashion along the open plane of the case opening 18a, as in the case of the fixing portion 41, with a rear side and a front side thereof positioned upward and downward, respectively, and each have passage holes 44a, 46a which enable the passages of the bolts 41a formed on the fixing portions 41. In the event of this embodiment, brackets 4, 4 on the body 1 side on which the upper mounting portions 45A, 47A are mounted are connected to an instrument panel reinforcement 2. In addition, brackets 5, 6 on which the lower mounting portions 45B, 47B are mounted are connected, respectively, to a center brace and a font body pillar, not shown, which lie on the body 1 side (refer to FIG. 4).

The airbag cover 54 is formed from an olefin-based thermoplastic elastomer, for example, and is made to cover a rear side of the case 17. In addition, the airbag cover 54 is provided on a lower panel 14b side of an instrument panel 14 which is made up of an upper panel 14a and a lower panel 14b and is made up of a door portion 55 which is provided in the vicinity of the opening 18a of the case 17, the attachment piece portions 58 and the attachment wall portion 59 via which the airbag cover 54 is attached to the case 17, and a circumferential edge portion 60 which is provided to lie on both left and right sides and an upper side of a circumferential edge of the door portion 55.

The door portion 55 is formed slightly larger than the opening 18a of the case and is formed into something like a substantially rectangular plate which covers the opening 18a. In addition, in this embodiment, the door portion 55 includes a thin fracture anticipated portion 56 which is formed into substantially an H-shape as viewed from the rear and hinge portions 57 which are provided along an upper edge and a lower edge of the door portion 55, respectively, so as to constitute rotational centers when the door portion 55 is fractured to be opened at the fracture anticipated portion 56, whereby the door portion 55 is made to be opened toward the upper and lower edges thereof, respectively, the thin fracture anticipated portion 56 and the hinge portions 57 being provided along a perimeter of the door portion 55.

Figure 3:
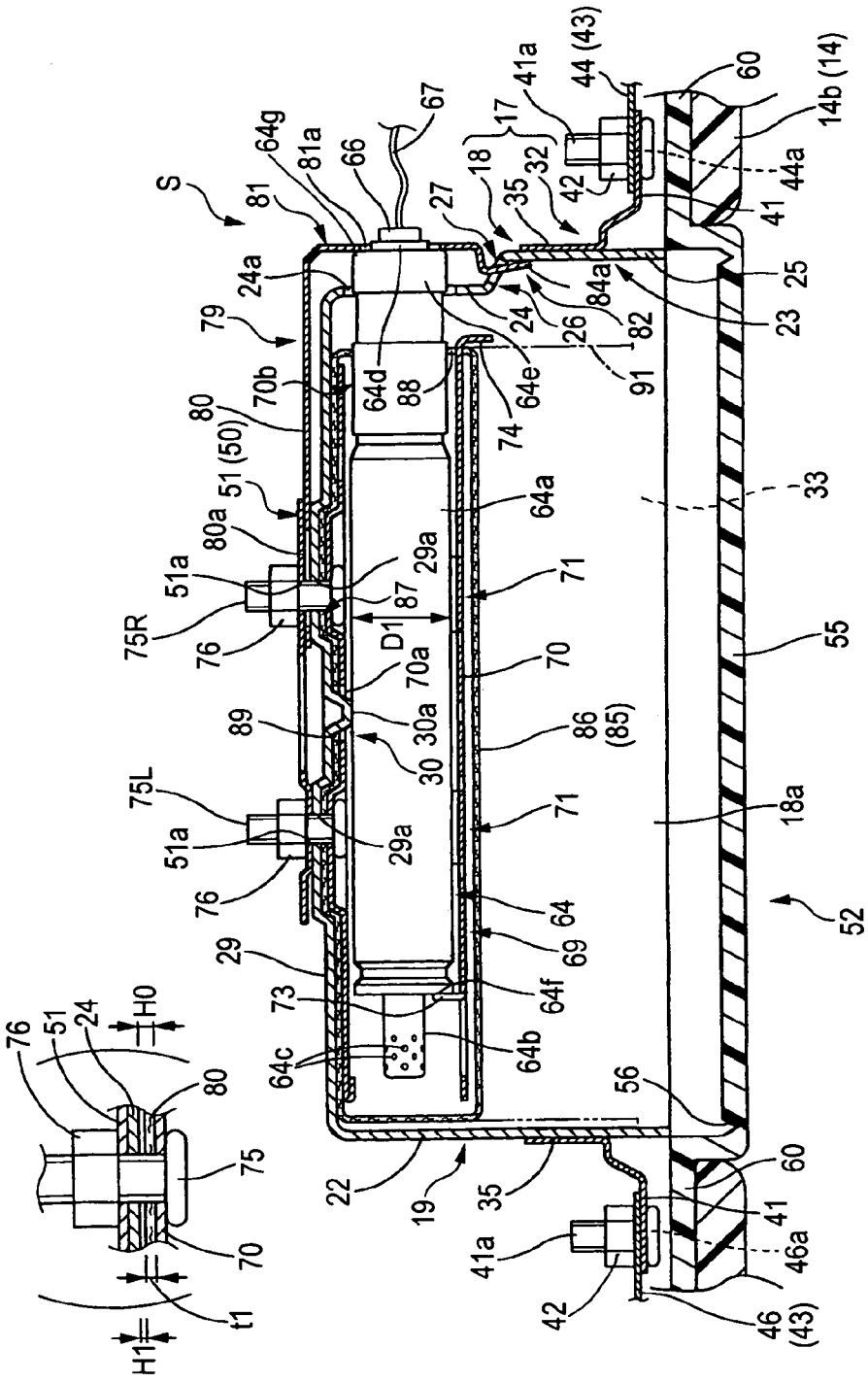
FIG. 3 is a schematic sectional view taken along a location indicated by the line III-III in FIG. 2.

The circumferential edge portion 60 is made lower than the level of the door portion 55 on both the left and right sides of the door portion 55 in such a manner as to be recessed toward the front of the vehicle, so as to be substantially level with a rearward surface of the lower panel 14b while supporting portions of the lower panel 14 which are provided to lie on the left and right sides of the door portion 55 (refer to FIG. 3).

The attachment piece portions 58 are such as to be provided to protrude forward as well as be adjacent to an outer side of the upper wall portion 20 of the case main body portion 18 and are provided at four locations along the transverse direction in such a manner as to match the locking claw portions 38, each attachment piece portion 58 including the locking hole portion 58a which is opened into a substantially rectangular shape so that the locking claw portion 38 is locked therein. In addition, a transverse width dimension of each attachment piece portion 58 is set to a dimension which allows the attachment piece portion 58 to pass through the through hole 37 in the mounting member 32.

The attachment wall portion 59 is such as to be provided to protrude forward as well as be adjacent to an outer side of the lower wall portion 21 of the case main body portion 18 and includes four locking hole portions 59a which are each opened into a rectangular shape so that the locking projections 40 are locked therein, respectively.

As shown in FIGS. 3, 5, the inflator 64 is formed into a circular cylinder which is disposed in such a manner that its axial direction extends substantially along the transverse direction and is made up of the large-diameter portion 64a and a small-diameter portion 64b which is made to protrude from a transverse end of the large-diameter portion 64a. A number of gas discharge ports 64c are formed in the small-diameter portion 64b through which inflation gas is discharged. In the event of this embodiment, the small-diameter portion 64b is disposed at a left end of the large-diameter portion 64a. A connection port portion 64d is formed at a right end 64e of the large-diameter portion 64a into which a connector 66 that is connected to an operation signal input lead wire 67 for connection to an airbag activation circuit is mounted. In the knee protection airbag device S of the embodiment, the inflator 64 is housed within the main body portion 18 in such a manner that the right end portion 64e thereof is made to protrude from the right wall portion 23 of the case main body portion 18.

Figure 6:
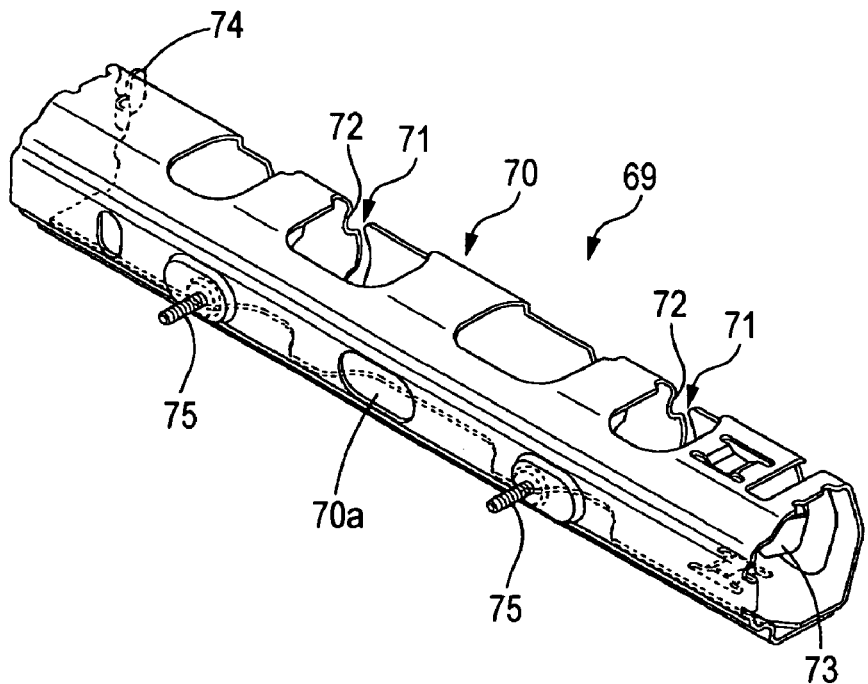
FIG. 6 is a perspective view of the retainer used in the embodiment which results when seen from the front.
Figure 7:
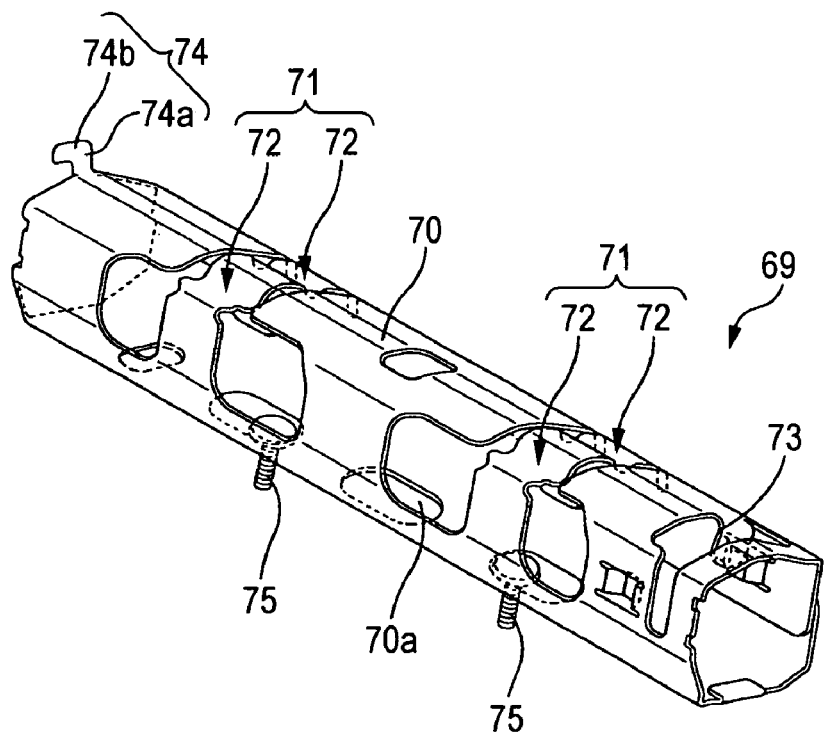
FIG. 7 is a perspective view of the retainer used in the embodiment in which a rear side thereof is directed upward.

As shown in FIGS. 6, 7, the retainer 69 is made up of a retaining part 70 which is formed from sheet metal into a substantially cylindrical shape so as to be provided on an outside of the inflator 64 and the two bolt parts 75, 75 which are provided thereon in such a manner as to protrude forward so as to intersect an axial direction of the retaining part 70 substantially at right angles.

The retaining part 70 is formed into the substantially cylindrical shape with its axial direction extending substantially along the transverse direction. Abutment portions 71 are formed on a portion of the retaining part 70 which is located on a rear side of the inflator 64 at two locations, respectively, which correspond to the bolt parts 75 along the transverse direction in such a manner as to be brought into abutment with an outer circumferential surface of the large-diameter portion 64a of the inflator 64 when installed on the vehicle. As viewed in a longitudinal cross section (a cross section which intersects the axial direction of the retaining part 70 at right angles), each abutment portion 71 includes two abutment support portions 72 which are disposed substantially vertically along a circumferential direction of the retaining part 70 at locations on a rear side of the retaining part 70 which face the bolt part 75 (refer to FIGS. 3, 19A, 19B). Each abutment support portion 72 is such as to be formed by curving the retaining part 70 inwardly toward the inflator 64 side (to an inner circumferential side), and in the event of this embodiment, the abutment support portion 72 is formed into substantially a semi-arc shape, as viewed in a cross section taken along a circumferential direction of the retaining part 70, so that a distal end surface 72a thereof is brought into abutment with the outer circumferential surface of the large-diameter portion 64a. In addition, a through hole 70a, which allows the passage of the support projection 30 formed on the bottom wall portion 29 of the case main body portion 18, is formed as an opening which is opened into substantially an oval shape with its major axial direction extending along the transverse direction at a location on the retaining part 70 which lies on a front side of the inflator 64 and between the bolt parts 75, 75 thereof when installed on the vehicle.

In addition, a projecting portion 73 is formed at a location lying in the vicinity of a left end of the retaining part 70 in such a manner as to project radially inward so as to position the inflator 64 at a distal end in an inserting direction when the inflator 64 is inserted thereinto (refer to FIG. 3). This projecting portion 73 is such as to be brought into abutment with a distal end face 64f of the large-diameter portion 64a of the inflator 64 which lies to the small-diameter portion 64b so as to restrict a leftward movement of the distal end face 64f to thereby position the small-diameter portion 64b (the gas discharge ports 64c) within the retainer 69.

Furthermore, in the retaining part 70, a portion at a right end is made to function as an insertion opening 70b which enables the insertion of the inflator 64 into the retaining part 70. In addition, a locking claw portion 74 is formed on a portion at the right end of the retaining part 70 which constitutes a circumferential edge of the insertion opening 70b in such a manner as to protrude from an inflator inserting opening slit 88 formed in the airbag 85 when the retainer 69 is housed within the airbag 85, so as to be locked at a circumferential edge of the inserting open slit 88. The locking claw portion 74 is such as to protrude from the inserting open slit 88 when the folding of the airbag 85 has been completed and is provided at a position which is symmetrical with the bolt part 75 with respect to a point such that the locking claw portion is projected on to a cross section of the retaining part 70 taken along a direction which intersects an axial direction thereof at right angles (an open plane of the inserting open slit 88), or, in the event of the embodiment, a position which lies in the vicinity of a rear end of the retaining part 70 when installed on the vehicle, as shown FIGS. 3, 8A. In the event of the embodiment, the locking claw portion 74 is formed into an L-like shape and includes a proximal portion 74a which protrudes rearward from the retaining part 70 and a hook piece portion 74b which is bent from a distal end of the proximal portion 74a in such a manner as to be directed upward (refer to FIGS. 7, 8A). In the knee protection airbag device S of the embodiment, during an assembling operation, after the airbag 85, which is folded with the retainer 69 housed therein, has been housed within the case 17, the inflator 64 is inserted into the airbag 85 from the open slit 88 via the passage hole 24a formed in the case main body portion 18, so as to be inserted into the retaining part 70 of the retainer 69, and in this configuration, the locking claw portion 74 is provided to prevent a positional deviation of the retaining part 70 of the retainer 69 housed within the airbag 85 relative to the open slit 88. In particular, in this embodiment, since the locking claw portion 74 is provided at the position which is symmetrical with the bolt parts 75 with respect to a point when the claw portion is projected on to a cross section of the retaining part 70 taken along a direction which intersects the axial direction thereof at right angles, when the folded airbag 85 is housed within the case main body portion 18, a front end 88a side and a rear end 88c side of the open slit 88 are retained on the locking claw portion 74 side and the bolt part 75 side, respectively, as shown in FIG. 8A, whereby the position of the retaining part 70 relative to the open slit 88 can be stabilized.

The dislodgement preventing member 79, which prevents the dislodgement of the inflator 64 from the case 17 when inflation gas is discharged, is provided at a position on an outer side of the case 17 which lies to a right end of the retainer 64. The dislodgement preventing member 79 is such as to be formed into substantially an L-shape as viewed from the top, as shown in FIGS. 9 to 12, and is made up of a securing plate portion 81 which is provided in such a manner as to secure the end portion 64e of the inflator 64, a locking hook 82 which is formed at a distal end (a front end) of the securing plate portion 81, and a fixing portion 80 which is disposed at a proximal end (a rear end) of the securing plate portion 81.

Figure 10:
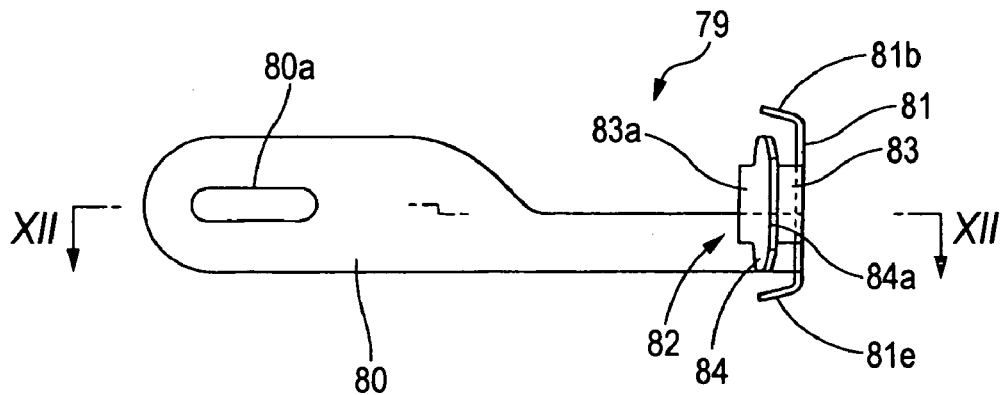
FIG. 10 is a front view of the dislodgement preventing member.
Figure 11:
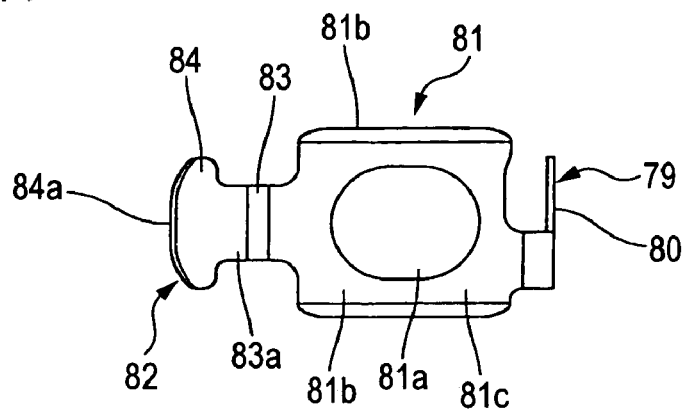
FIG. 11 is a right side view of the dislodgement preventing member.
Figure 12:
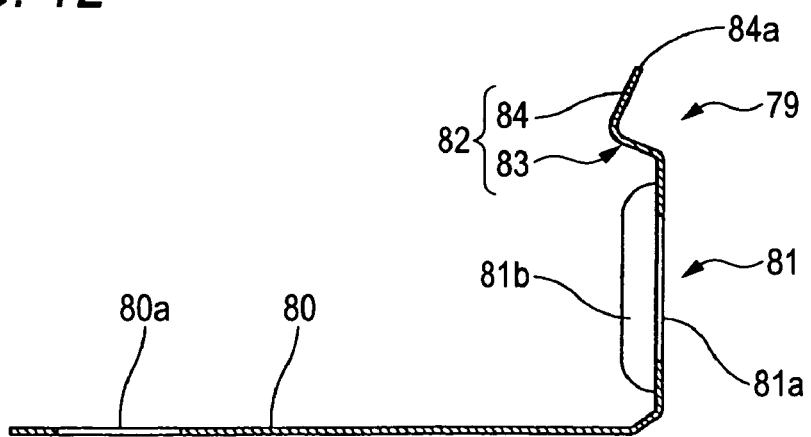
FIG. 12 is a sectional view taken along a location indicated by the line XII-XII in FIG. 10.
Figure 13:
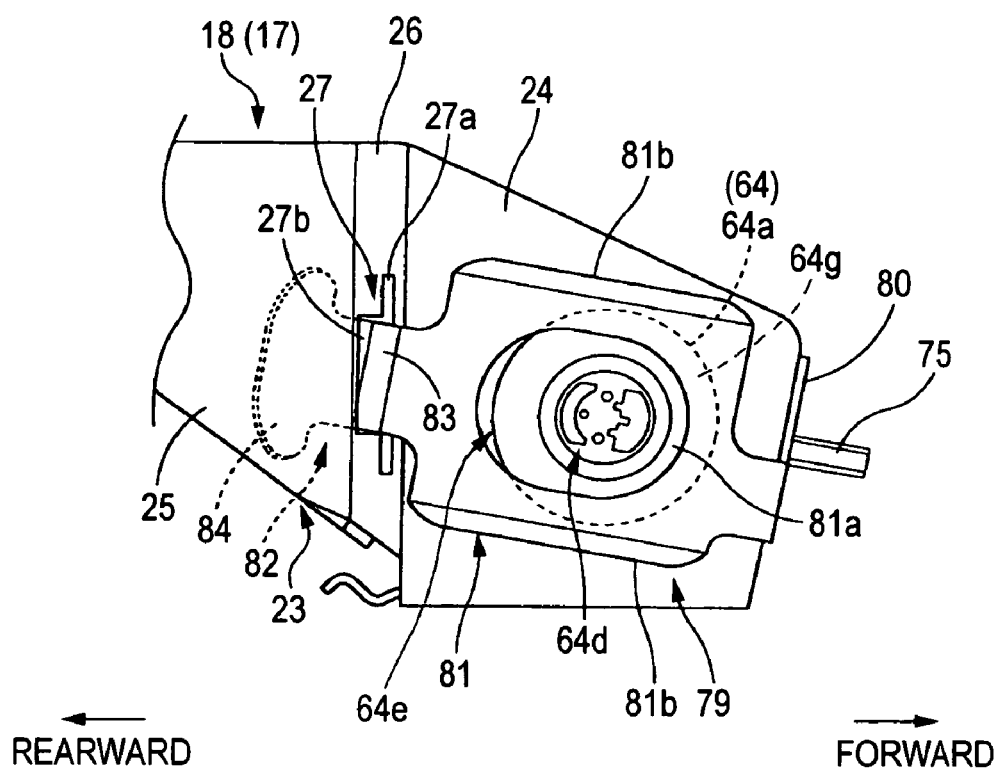
FIG. 13 is a partially enlarged side view of the case showing a state in which the inflator is housed in the airbag which is housed in the case and the dislodgement preventing member is mounted on the case, which side view results when viewed from the right.
Figure 15:
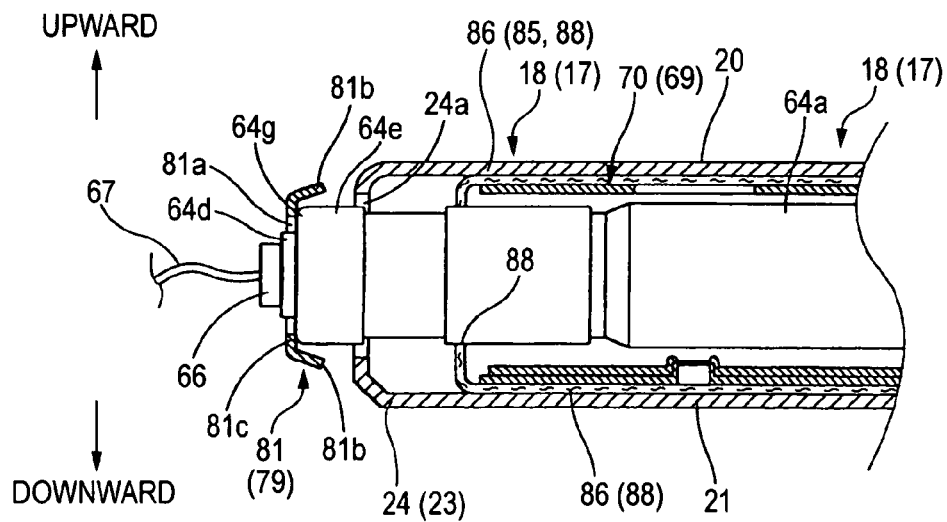
FIG. 15 is a partially enlarged sectional view of the knee protection airbag device of the embodiment showing the vicinity of the dislodgement preventing member, which sectional view constitutes a vertical sectional view of the system.

The securing plate portion 81 is such as to be provided to extend along the longitudinal direction in such a manner as to intersect the axial direction of the inflator 64 substantially at right angles at a location which lies to the right of the proximal wall portion 24 of the right wall portion 23 of the case main body portion 18 (to the right of the end portion 64e of the inflator) and is formed into something like a substantially rectangular plate with its longitudinal direction extending the longitudinal direction of the vehicle (a direction in which the bolt parts 75 protrude). An opening 81a is formed in the vicinity of the center of the securing plate portion 81 in such a manner as to enable the protrusion therefrom of the connection port portion 64d which is protruded from an end face 64g of the end portion 64e of the inflator. This opening 81a is formed into substantially an oval shape with its major axial direction extending substantially along the longitudinal direction and is constructed so as to secure a location on the end face 64g of the end portion 64 of the inflator which lies on a circumferential edge of the connection port portion 64d (refer to FIG. 13). In the event of the embodiment, a vertical opening width dimension of the opening 81a is set to be smaller than the dimension of an outside diameter of the large-diameter portion 64a. In addition, flange portions 81b, 81b are provided on vertical edge portions of the securing plate portion 81 in such a manner as to protrude toward the case main body portion 18 side. In the event of the embodiment, as shown in FIGS. 10, 15, the flange portions 81b, 81b are provided in an inclined fashion in such a manner as to be expanded toward the case main body portion 18 side so as to be disposed in the vicinity of upper and lower sides, respectively, of the end portion 64e of the inflator 64 which protrudes from the case main body portion 18, to thereby suppress a vertical movement of the inflator 64 when inflation gas is discharged.

The fixing portion 80 is protruded from the front end of the securing plate portion 81 in the transverse direction and is disposed on an outer side (a front side) of the bottom plate portion 29 of the case main body portion 18. A passage hole 80a is provided in the fixing portion 80 as an elongated hole which is provided substantially along the transverse direction for enabling the passage therethrough of the right bolt part 75R on the retainer 69. The fixing portion 80 is fastened together with the retainer 69 when the nut 76 is fastened onto the bolt part 75 (75R) thereof to thereby be fixed to the case main body portion 18. In the dislodgement member 79 of the embodiment, when mounted on the case main body portion 18, since the bolt part 75R is designed to be passed through the passage hole 80a after the locking hook 82 has been locked on the right wall portion 23, the passage hole 80a is formed into the elongated hole which extends along the transverse direction in order to improve the workability in mounting the inflator.

The securing portion 81 is formed into something like a substantially rectangular plate which is provided to intersect the axial direction of the inflator 64 at right angles with its longitudinal direction extending substantially along the longitudinal direction of the vehicle (the direction in which the bolt parts 75 protrude). An opening 81a is formed in the securing portion 81 in the vicinity of the center thereof which enables the protrusion of the connection port portion 64d of the inflator 64. This opening 81a is formed into an oval shape with its major axial direction extending substantially along the longitudinal direction of the vehicle and the dimension of a vertical opening width thereof is set to be smaller than the dimension of an outside diameter of the large-diameter portion 64a so as to enable the securing of the end face of the end portion 64e of the inflator 64 by a circumferential edge portion thereof. In addition, flange portions 81b, 81b are provided at upper and lower edge portions of the securing portion 81 in such a manner as to protrude toward the case main body portion 18 side. In the event of this embodiment, as shown in FIG. 15, the flange portions 81b, 81b are provided in an inclined fashion in such a manner as to be expanded toward the case main body portion 18 side so as to be disposed in the vicinity of upper and lower sides of the end portion 64e of the inflator 64 which protrudes from the case main body portion 18 to thereby suppress vertical movements of the inflator 64 when inflation gas is discharged.

The locking hook 82 is formed in such a manner as to protrude rearward from the vicinity of a vertical center of the securing portion 81, and in the event of this embodiment, the locking hook 82 is formed to extend in the longitudinal direction while being bent into substantially a Z-shape as viewed in cross section. The locking hook 82 is made up of the neck portion 83 which is narrowed with respect to a vertical width dimension thereof and is provided on a proximal side of the locking hook 82 and the head portion 84 which is made wider than the neck portion 83 with respect to a vertical width dimension thereof and is provided on a distal end side of the neck portion. In the event of this embodiment, the locking hook 82 bends once toward an inside of the case main body portion 18 (leftward) in the area of the neck portion 83 and thereafter bends toward an outside of the case (rightward) so as to direct the distal end 84a of the head portion 84 rightward, whereby the locking hook 82 is formed into substantially the Z-shape in section. In addition, the locking hook 82 is inserted from the passage hole 27 formed in the right wall portion 23 of the case main body portion 18 and is, as shown by a chain double-dashed line in FIG. 14, brought into abutment with an inner surface of the right wall portion 23 at the distal end 84a of the head portion 84 such that the neck portion 83 is inserted in the narrower portion 27b of the passage hole 27. The passage hole 27 in the case main body portion 18 is such as to be formed at the location of the inclined wall portion 26 lying on the circumferential edge of the passage hole 24a which enables the passage of the inflator and is formed into the turned substantially T-shape of which a proximal wall portion 24 side is made wider and which is made up of the wider portion 27a having an opening width dimension which enables the passage of the head portion 84 of the locking hook 82 and the narrower portion 27b having the opening width dimension which enables the passage of only the neck portion 83 of the locking hook 82, to thereby be locked on the circumferential edge f the narrower portion 27b at the head portion 84 in such a manner as to disable the dislodgement the head portion 84 which is in abutment with the inner surface of the distal wall portion 25. In addition, in this embodiment. In addition, in this embodiment, as shown by chain double-dashed lines in FIG. 14, before the nut 76 is fastened, the locking hook 82 is provided in such a manner that the distal end 84*a* is brought into abutment with the inner surface of the distal wall portion 25, when the nut 76 is fastened onto the bolt part 75R, the locking hook 82 is locked on the case main body portion 18 in such a manner that a portion covering from a head portion 84 side portion of the neck portion 83 which bends toward the outside of the case (rightward) to the head portion 84 deflects toward the inner circumferential side of the main body portion 18 (leftward) such that the distal end 84*a* of the head portion 84 is kept in press contact with the inner surface of the right wall portion 23, the generation of abnormal noise can be suppressed which would otherwise be triggered by the head portion 84 which is vibrated against the right wall portion 23 when the vehicle is running.

In the event of the embodiment, the airbag 85 is such as to be formed of a flexible woven fabric made from polyester or polyamide threads and when completing its inflation, the airbag 85 is inflated into something like a substantially rectangular plate shape, as shown by a chain double-dashed line in FIGS. 1, 4, which then has a transverse width dimension which is sufficient to protect both knees KL, KR of the driver MD. In the event of the embodiment, the airbag 85 is made up of an occupant side wall portion 85*a* which lies to the occupant MD and a body side wall portion 85*b* which lies to the column cover 13 which constitutes part of the body when the airbag 85 completes its inflation and is formed into a flat airbag in which respective external shapes of the wall portions 85*a*, 85*b* are made substantially identical to each other. In the event of the embodiment, as shown in FIGS. 16, 17, the airbag 85 is made up of a mounting portion 86 which is disposed within the case main body portion 18 when the airbag 85 completes its inflation and a protecting inflating portion 91 which protrudes rearward from the opening 18*a* of the main body portion 18 to protect the knees KL, KR of the driver MD when the airbag 85 completes its inflation.

Figure 16:
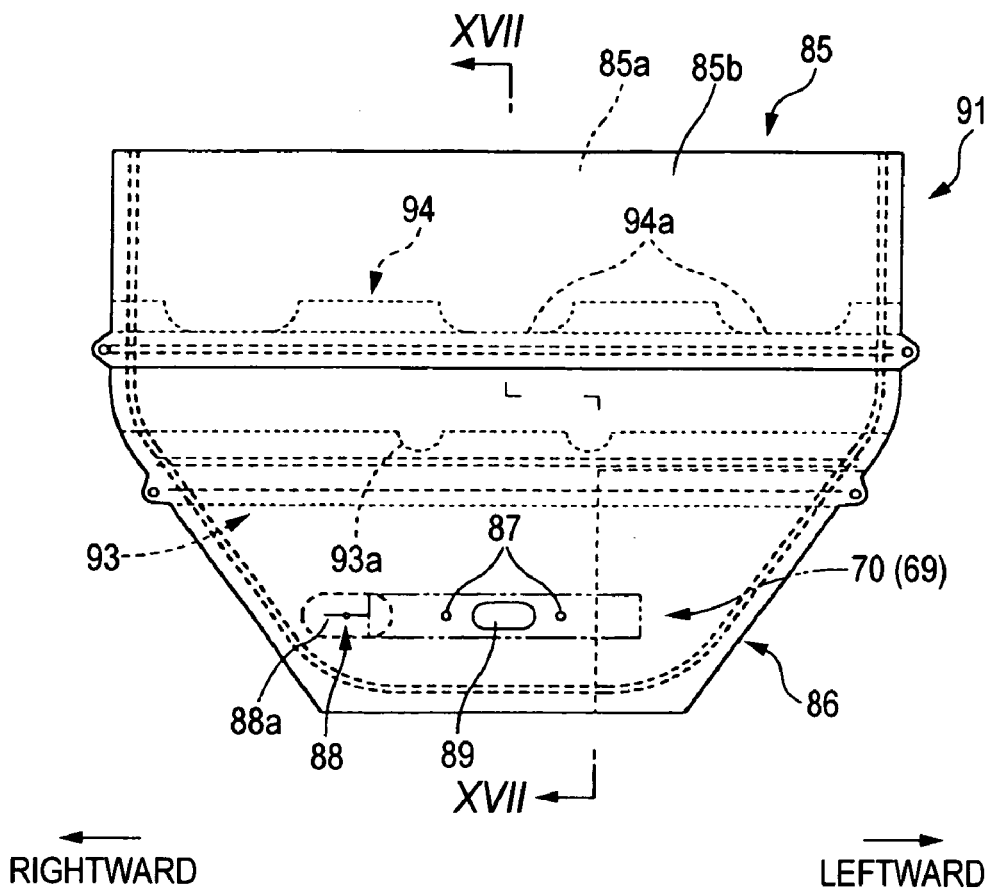
FIG. 16 is a rear view of the airbag used in the embodiment.
Figure 16:
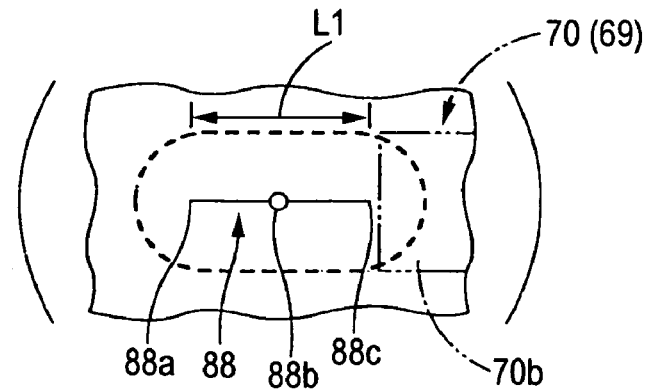
Figure 17:
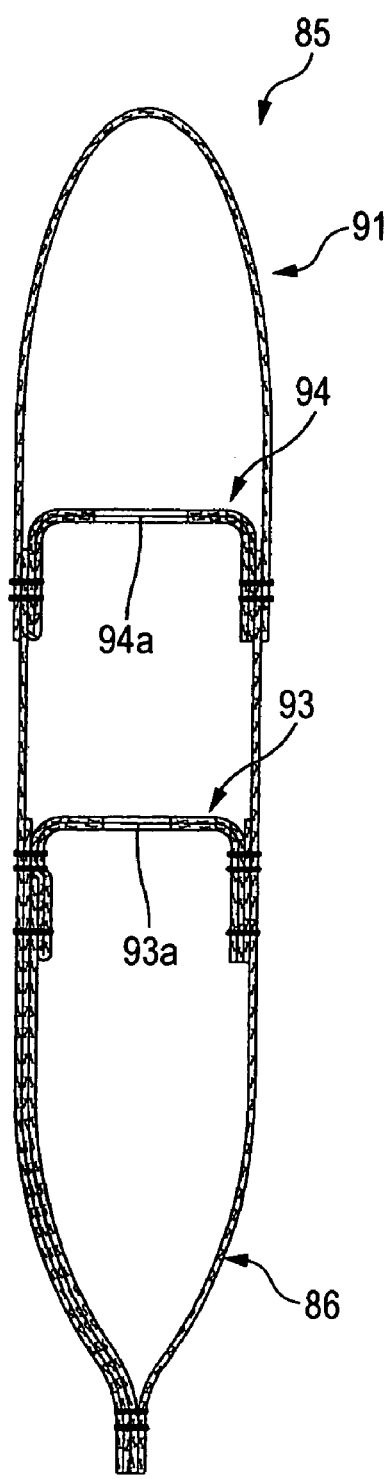
FIG. 17 is a schematic enlarged sectional view of the airbag taken along a location indicated by the line XVII-XVII in FIG. 16.

As shown in FIG. 16, two passage holes 87, 87, the inserting open slit 88 which is formed into a slit shape for enabling the insertion of the inflator and a through hole 89 are formed in a location on the body side wall portion 85*b* where the mounting portion 86 resides. The passage holes 87, 87 are for enabling the passage of the bolt parts 75 on the retainer 69, respectively. The inserting open slit 88 is such as to be formed into a straight line which extends transversely such that the airbag 85 is developed flat as a single element (refer to FIG. 15), and when the airbag 85 is installed on the vehicle after it has been folded, the inserting open slit 88 is formed to extend substantially along the longitudinal direction, as shown in FIG. 8A. In the event of the embodiment, the inserting open slit 88 is formed in such a manner that its lengthwise dimension L1 becomes larger than an outside diameter dimension D1 (refer to FIG. 3) of the large diameter portion 64*a* of the inflator 64. In addition, the inserting open slit 88 is formed in such a manner as to enable the locking claw portion 74 on the retainer 69 from the right end (the front end when installed on the vehicle) 88*a* such that the airbag 85 is folded with the retainer 69 housed in the interior thereof. Namely, such that the airbag 85 is developed flat with the retainer 69 housed in the interior thereof, the end portion (the insertion opening 70*b*) of the retaining part 70 is provided in the vicinity of a left end (a rear end when installed on the vehicle) of the inserting open slit 88 (refer to FIG. 16). Additionally, in the event of the embodiment, a through hole 88*b* having a small diameter is formed in the vicinity of the center of the inserting open slit 88 in such a manner as to communicate with the slit 88. This through hole 88*b* is formed with a view to facilitating the insertion work of the inflator 64. The through hole 89 is for allowing the passage of the support projection 30 formed on the bottom wall portion 29 of the case main body portion 18 and is formed between the through holes 87, 87 in such a manner as to be opened into substantially an oval with its major axial direction extending substantially along the transverse direction.

In the airbag 85 of the embodiment, two tethers 93, 94 are provided within the airbag 85 in such a manner as to extend substantially along the transverse direction. The tether 93 is provided to divide the airbag 85 into the mounting portion 86 and the protecting inflating portion 91, and the tether 94 is provided to divide the area of the protecting inflating portion 91 into upper and lower parts. A plurality of gas passing holes 93*a*, 94*a*, which enable the passage of inflation gas, are formed in the tethers 93, 94, respectively.

Next, an airbag assembly SA which makes up the knee protection airbag device S of the embodiment will be described. Firstly, the airbag 85 which installs therein the retaining part 70 of the retainer 69 is folded. To be specific, firstly, as shown in FIGS. 18A, 18B, the airbag 85, which is developed flat in such a manner that the occupant side wall portion 85*a* and the body side wall portion 85*b* are superposed on each other, is folded into a roll while forming transverse folds by rolling an upper edge on to the side of the body side wall portion 85 in such a manner as to reduce the longitudinal widthwise dimension. Thereafter, as shown in FIGS. 18B, 18C, the airbag, which has been so folded into the roll, is folded in such a manner that left and right side portions thereof are folded on to the side of the body side wall portion 85*b* while forming longitudinal folds so as to reduce the transverse widthwise dimension. Then, as shown in FIGS. 18C, 18D, when a portion which constitutes a front side of the retainer 69 is folded on to the side of the occupant side wall portion 85*a*, the folding of the airbag can be completed. As this occurs, the locking claw portion 74 provided on the retaining part 70 protrudes from the front end (the right end) of the inserting open slit 88, so as to leave the locking claw portion 74 locked at the circumferential edge of the inserting open slit 88 (refer to FIGS. 18A to 18D). Thereafter, the folded airbag 85 is wrapped by a breakable wrapping material, not shown, which prevents the collapse of the fold of airbag. As this occurs, the bolt parts 75 are left protruding from the wrapping material and the inserting open slit 88 and the through hole 89 are left exposed from the wrapping material.

Figure 8B:
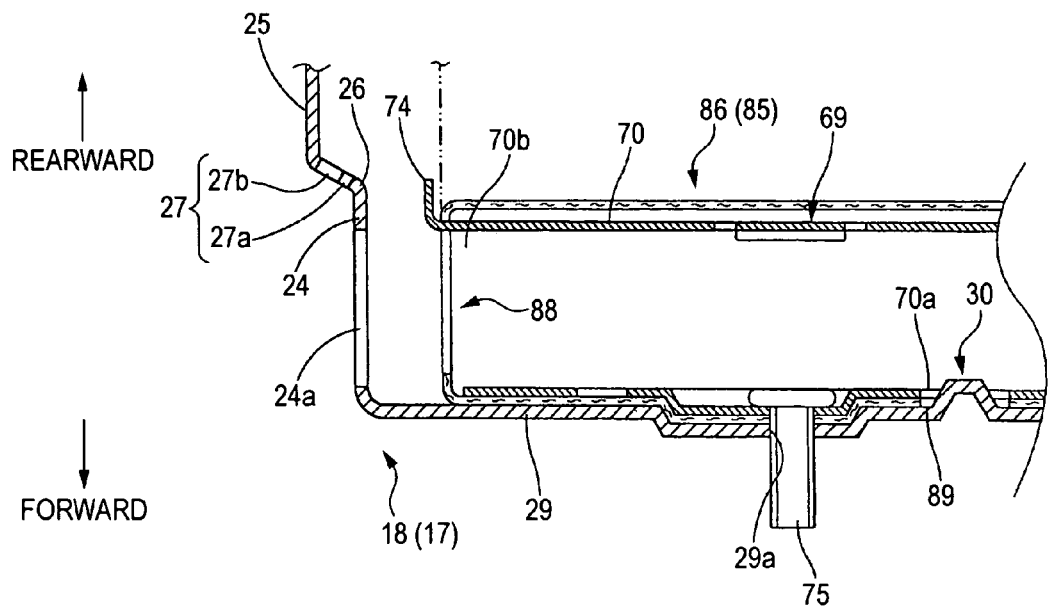
FIG. 8B is a partially enlarged sectional view showing a location in the vicinity of a locking claw portion such that the airbag which is folded with the retainer housed in an interior thereof is housed within the case, which enlarged sectional view shows a horizontal sectional view.

Following this, the folded airbag 85 is, as shown in FIG. 8B, housed within the case 17 in such a manner that the bolt parts 75 protrude from the passage holes 29*a*. As this occurs, the support projection 30, which is formed on the case bottom wall portion 29, is disposed so as to protrude to the inner circumferential side of the retainer 69 after having passed through the through hole 89 in the airbag 85 and the through hole 70*a* in the retainer 69 (refer to FIG. 8B). Thereafter, the inflator 64 is inserted from the gas discharge port 64*c* side into the airbag 85 (into the retaining part 70 of the retainer 69) through the inserting open slit 88 after it has passed through the passage hole 24*a* formed in the right wall portion 23 of the case 17 (refer to FIG. 19A). As this occurs, the inflator 64 continues to be inserted until the distal end face 64*f* of the large-diameter portion 64*a* comes into abutment with the projecting portion 73 formed on the retaining part 70 of the retainer 69.

Then, the airbag cover 54 is attached to the case 17. In this case, firstly, the attachment piece portions 58 of the airbag cover 54 are inserted into the through holes 37 in the case 17, respectively, so that the locking claw portions 38 are inserted into the locking hole portions 58*a* formed in the attachment piece portions 58, respectively, so as to be locked on the circumferential edges of the locking hole portions 58a. Thereafter, the locking projections 40 are inserted into the locking hole portions 59a formed in the attachment wall portion 59, respectively. Next, the dislodgement preventing member 79 is attached to the case 17. In this case, firstly, the head portion 84 of the locking hook 82 is inserted into the wider portion 27a of the passage hole 27 formed in the right wall portion 23 of the case 17, and the head portion 84 is made to be locked on a circumferential edge of the passage hole 27 by passing the neck portion 83 through the narrow portion 27b. Then, the right bolt part 75R is passed through the passage hole 80a in the fixing portion 80 by rotationally moving the fixing portion 80 side about the vicinity of the neck portion 83 as a rotating center, so that the dislodgement preventing member 79 is disposed on the outer side of the case 17. As this occurs, the head portion 84 of the locking hook 82 is formed in such a manner that the distal end 84a is in abutment with the inner surface of the right wall portion 23 (the distal wall portion 25). In addition, when the nut 76 is fastened onto the bolt part 75, the head portion 84 of the locking hook 82 is brought into press contact with the inner surface of the right wall portion 23 at the distal end 84a thereof in such a manner that the portion covering from the head portion 84 side portion of the neck portion 83 which bends toward the outside of the case (rightward) to the head portion 84 deflects toward the inner circumferential side of the main body portion 18 (leftward).

Thereafter, the securing member 50 is disposed in such a manner that the inserting portions 52 are inserted into the inserting holes 40b in the locking projections 40 which project from the attachment wall portion 59, respectively, from a front side of the case 17 and that the bolt parts 75 are passed through the passage holes 51a in the fixing portion 51, respectively. Following this, the right and left panel portions 44, 46, which make up the knee panel 43, are disposed in such a manner that the bolts 41a are passed through the passage holes 44a, 46a, respectively. Thereafter, when the nuts 42, 76 are fastened onto the bolt parts 75 and the bolts 41a, respectively, the airbag assembly SA can be assembled.

Figure 19A:
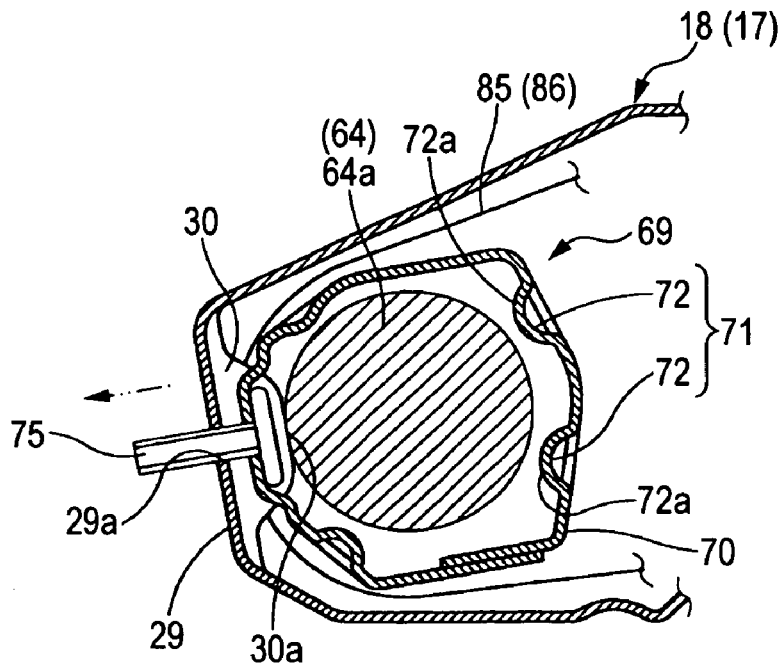
FIG. 19A, 19B are schematic partially enlarged sectional views of the knee protection airbag device of the embodiment which show steps of fastening a nut onto a bolt part of the retainer which protrudes from the case.
Figure 19B:
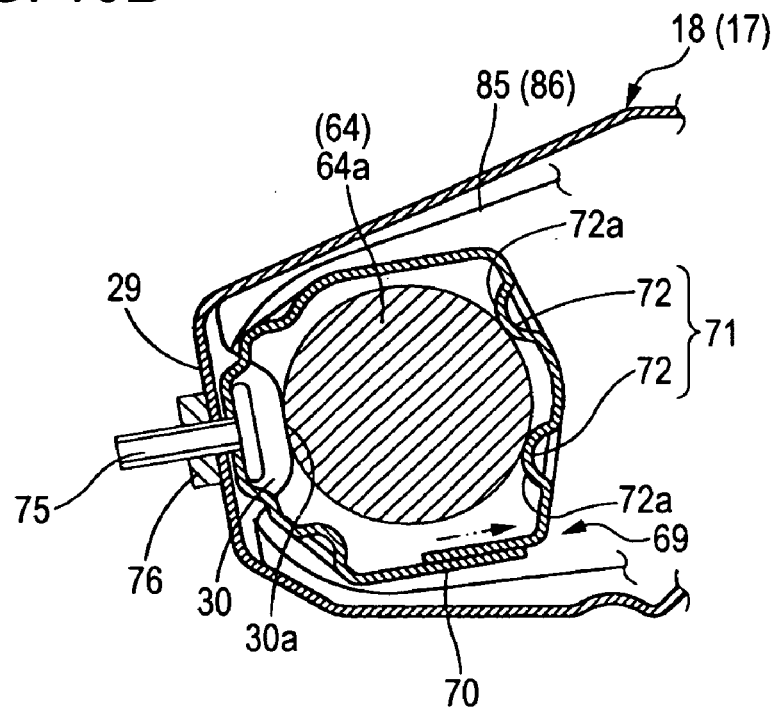

During the fastening work of the nut 76, in the locking hook 82 of the dislodgement preventing member 79, mainly the portion covering from the head portion 84 side portion 83a of the neck portion 83 to the head portion 84 deflects toward the inner surface (the left side) of the main body portion 18, and the distal end 84c of the head portion 84 is provided in such a manner as to be brought into press contact with the inner surface of the distal wall portion 25 lying on the circumferential edge of the passage hole 27. In addition, as shown in FIGS. 19A, 19B, when the nuts 76 are fastened, the retainer 69 moves the retaining part 70 provided on the outside of the inflator 64 to the bottom wall portion 29 side. Namely, a state occurs in which on the contrary, the support projection 30 formed on the bottom wall portion 29 pushes the inflator 64 rearward with the distal end portion 30a thereof brought into abutment with the outer circumferential surface of the inflator 64. Then, the inflator 64 is brought into abutment with the distal end faces 72a of the respective abutment support portions 72 of the abutment portions 71 formed on the retaining part 70, whereby the inflator 64 is held by the distal end faces 72a of the four abutment support portions 72 which are provided on a rearward side of the inflator 64 and the distal end portion 30a of the single support projection 30 which is provided on a forward side of the inflator 64, to thereby be retained by the retainer 69. Note that while omitted in FIG. 19A, 19B, the fixing portion 51 of the securing member 50 and the fixing portion 80 of the dislodgement preventing member 79 are interposed between the case bottom wall portion 29 and the nuts 76.

Then, the airbag assembly SA assembled as has been described heretofore is fixedly mounted on the body 1 side by making use of the brackets 4, 5, 6, and at the same time, the connector 66 to which the lead wire 67 is connected is connected into the connection port portion 64d of the inflator 64 which is exposed from the opening 81a in the securing portion 81 of the dislodgement preventing member 79. Thereafter, when the instrument panel 14 and an undercover 15 (refer to FIGS. 1, 2) are mounted, the airbag device S can be installed on the vehicle.

After the airbag device S has been installed on the vehicle, when an operation signal is inputted into the inflator 64 via the lead wire 67, inflation gas is discharged from the gas discharge ports 64c of the inflator 64 and is then allowed to flow into the airbag 85. Then, the airbag 85 is inflated to break the wrapping material, not shown, and presses against the door portion 55 of the airbag cover 54 to break the door portion 55 at the breakage anticipated portion 56. Following this, the door portion 55 opens vertically about the hinge portions 57 as rotating centers, so that the airbag 85 is deployed and inflated as indicated by a chain double-dashed line in FIGS. 1, 4.

Then, in the knee protection airbag device S of the embodiment, when fixing the inflator 64 and the airbag 85 to the case 17, the bolt parts 75 of the retainer 69 which are caused to protrude from the airbag 85 are caused to protrude from the bottom wall portion 29 which functions as the fixing wall portion of the case 17, and thereafter, when the nuts 76 are fastened onto the bolt parts 75, the retaining part 70 which is provided on the outside of the retainer 64 is moved to the bottom wall portion 29 side, so that the inflator 64 is held between and retained by the abutment support portions 72 of the abutment portions 71 formed on the retaining part 70 and the support projection 30 formed on the bottom wall portion 29. Namely, in the airbag device S of the embodiment, the inflator 64 can be retained by the retainer 69 at the same time as the nuts 76 are fastened to fix the airbag 85 and the retainer 69 to the bottom wall portion 29 of the case 17, whereby the clamping work, which is necessary in the conventional example, can be omitted. As a result, the number of manhours necessary for assembling the airbag device S can be reduced.

Consequently, according to the airbag device S of the embodiment, the inflator 64 is allowed to be retained by the retainer 69 while obviating the necessity of performing the clamping work, thereby making it possible to reduce the number of assembling manhours.

In addition, in the airbag device S of the embodiment, the inflator 64 is retained by the retainer 69 at the same time as the retainer 69 is fixed to the case 17. In particular, in the airbag device S of the embodiment, as has been described above, the airbag device S is designed to be assembled by inserting the inflator 64 into the retainer 69 through the open slit 88 in the airbag 85 after the airbag 85, which has been folded with only the retainer 69 housed therein, is housed within the case 17, and hence the airbag 85 which incorporates therein the retainer 69 and the case are assembled together as an assembly, so that an assembling operation of only the inflator 64 to the assembly of the airbag 85 and the retainer 69 can be performed at a different site.

Furthermore, in the airbag device S of the embodiment, the abutment support portions 72 of the abutment portions 71 formed on the retaining part 70 of the retainer 69 are disposed at the two positions on each of the locations which correspond to the bolt parts 75, 75, respectively, as viewed in the cross section of the retaining part 70 taken along the direction which intersects the axis thereof at right angles. Due to this, the inflator 64 is retained by the two abutment support portions 72, 72 which are provided along the circumferential direction on the rearward side of the inflator and the support projection 30 provided on the forward side of the inflator 64 as viewed in the cross section of the retaining part 70 taken along the direction which intersects the axis thereof at right angles, whereby since the inflator 64 can be supported at the three points lying along the circumferential direction, the inflator 64 can be retained by the retainer 69 more stably. Note that in case the aforesaid advantage is not taken into consideration, a configuration may be adopted in which the abutment support portion is provided only at one position as viewed in the cross section of the retaining part taken along the direction which intersects the axis thereof at right angles, whereby the inflator is supported at two points along the circumferential direction of the retaining part 70. In addition, on the contrary, a configuration may be adopted in which two support projections are provided in the circumferential direction, so that the inflator is retained by the two support projection and the single abutment support portion. Even in the event that this configuration is adopted, since the inflator is supported at three points lying along the circumferential direction, the inflator can be retained stably by the retainer.

Furthermore, in the airbag device S of the embodiment, the bolt parts 75 of the retainer 69 are provided at the two positions lying along the axial direction of the retaining part 70, and the support projection 30 formed on the case bottom wall portion 29 is positioned between the passage holes 29a, 29a which enable the passage of the bolt parts 75, 75, respectively. Due to this, when assembling the airbag assembly SA, in a case where the airbag 85 which is folded with only the retainer 69 housed in the interior thereof is housed within the case 17, the retainer 69 having the two bolt parts 75, 75 which are passed through the airbag 85 stabilizes its position relative to the airbag 85, whereby work to cause the bolt parts 75 to protrude from the bottom wall portion 29 can be preferably facilitated. Of course, in case this advantage is not taken into consideration, a configuration may be adopted in which the bolt part is provided only at one position.

In addition, in the airbag device S of the embodiment, the through hole 89 is provided in the airbag 85 which enables the passage of the support projection 30 formed on the case bottom wall portion 29. Namely, in the airbag device S of the embodiment, since the support projection 30 is brought into direct abutment with the outer circumferential surface of the inflator 64 without the base fabric making up the airbag 85 interposed therebetween, the support projection 30 is free from the effect of aging of the base fabric making up the airbag 85, thereby making it possible to stabilize the tightening force of the nuts 76, whereby the inflator 64 can be stably retained by the retainer 69. Of course, in case this advantage is not taken into consideration, a configuration may be adopted in which the through hole 89 is not formed in the airbag 85, whereby the base fabric making up the airbag 85 is left interposed between the support projection 30 and the inflator 64.

Additionally, in the airbag device S of the embodiment, a gap H0 is set to be equal to or greater than a thickness dimension t1 of the base fabric making up the airbag 85 so that the airbag 85 is not tightened between the case bottom wall portion 29 and the retaining part 70 of the retainer 69 when tightening the nuts 76. To be specific, in the event of the embodiment, the gap H0 between the case bottom portion 29 and the retaining part 70 is set greater than the thickness dimension t1 of the base fabric, so as to generate a gap H1 between the airbag 85 and the case bottom portion 29 (or the retaining part 70) when tightening the nuts 76 (refer to FIG. 3). This configuration is preferred to keep the tightening force of the nuts 76 unaffected as much as possible by the aging of the base fabric making up the airbag 85. Note that while in the embodiment, the gap H1 is formed between the airbag 85 and the case bottom portion 29 (or the retaining part 70) when tightening the nuts 76, a configuration may be adopted in which the gap H0 between the case bottom wall portion 29 and the retaining part 70 is set to be substantially the same as the thickness dimension t1 of the base fabric making up the airbag 85, so as to generate no gap between the airbag 85 and the case bottom wall portion 29 (or the retaining part 70). Then, in this configuration, the airbag 85 is retained by the retainer 69 at locations which constitute circumferential edges of the bolt parts 75 on the retaining part 70 of the retainer 69 to thereby be fixed to the case main body portion 18.

Then, in the knee protection airbag device S of the embodiment, even though the inflator 64 attempts to move the end portion 64e thereof into which the connector 66 is connected in such a manner as to protrude from the passage hole 24a when inflation gas is discharged, the end portion 64e of the inflator 64 is secured by the securing plate portion 81 of the dislodgement preventing member 79 that is provided so as to intersect the axial direction of the inflator 64 substantially at right angles. Since the securing plate portion 81 is fastened together with the retainer 69 to the case bottom wall portion 29 by the bolt part 75 on a front side thereof, while being locked on the circumferential edge of the passage hole 27 in the case right wall portion 23 by the head portion 84 of the locking hook 82 on a rear side thereof, not only a rightward movement but also a leftward movement of the securing plate portion 81 is restricted. Due to this, a rightward movement of the a rightward axial movement of the inflator 64 is suppressed by the securing plate portion 81. As a result, even though the inflator 64 is constructed so as to be retained by the retaining part of the retainer 69 while being held on the outer circumferential surface thereof as done in this embodiment, the inflator 64 can be restrained from moving along the axial direction thereof so as to protrude from the case 17 when inflation gas is discharged.

Consequently, according to the knee protection airbag device S of the embodiment, the inflator 64 can be retained stably even when inflation gas is discharged.

In addition, in the knee protection airbag device S of the embodiment, since the dislodgement preventing member 79 is configured so as to be fixed to the case 17 by the locking hook 82 which is locked on the circumferential edge of the passage hole 27 and the fixing portion which is fixed to the case 17 by being fastened together with the retainer 69 when the nut 76 is fastened onto the bolt part 75R of the retainer 69, the dislodgement preventing member 79 can be fixed to the case 17 at the same time as the fastening work of the nut 76 is carried out to fix the retainer 69 to the case 17, thereby making it possible to reduce the number of manhours for assembling the airbag device.

Furthermore, in the knee protection airbag device S of the embodiment, the locking hook 82 of the dislodgement preventing member 79 is locked on the circumferential edge of the passage hole 27 by passing the locking hook 82 through the passage hole 27 so that the distal end 84a of the head portion 84 is brought into press contact with the distal wall portion 25 which lies on the circumferential edge of the passage hole 27 from an inner circumferential side of the case 17. Namely, in the airbag device S of the embodiment, since the distal end 84c of the locking hook 82 is supported on the location of the distal wall portion 25 which lies on the circumferential edge of the passage hole 27 on the inner surface of the case 17, the securing plate portion 81 can be prevented from moving along the axial direction of the inflator 64 as much as possible. In addition, since the distal end 84a of the head portion 84 of the locking hook 82 is in press contact with the distal wall portion 25 which lies on the circumferential edge portion of the passage hole 27, the generation of abnormal noise can be suppressed which would otherwise be triggered by the locking hook 82 which is vibrated against the case 17 when the vehicle is running.

Note that while in the embodiment, the knee protection airbag device S is described in which the inflator 64 is retained by the retaining part 70 of the retainer 69 after the airbag 85, which is folded with only the retainer 69 housed in the interior thereof, is housed within the case 17, airbags to which the invention can be applied are not limited thereto, and hence, the invention may be applied to a knee protection airbag device in which an inflator is held by a retainer with no other support by clamping predetermined positions, the retainer and the inflator are then housed in an airbag, which is then folded, and thereafter, the folded airbag is housed within a case.

In addition, in the knee protection airbag device S of the embodiment, since the locking claw portion 74 formed on the retaining part 70 of the retainer 69 protrudes from the inserting open slit 88 in the airbag 85 so as to be locked at the circumferential edge of the inserting open slit 88 when the folding of the airbag 85 has been completed, the deviation of the position of the retaining part 70 relative to the inserting open slit 88 can be prevented by the locking claw portion 74 which is locked at the circumferential edge of the inserting open slit 88 when the airbag 85 is housed within the case 17 (refer to FIG. 8B). In addition, in the knee protection airbag device S of the embodiment, since the center of the inflator inserting opening 70b in the retaining part 70 is substantially aligned with the center axis (the through hole 88b) of the inserting open slit 88 as shown in FIGS. 8A, 8B, when the folded airbag 85 is housed within the case 17, the inflator 64 can be inserted into the interior of the retaining part 70, when the inflator 64 is inserted from the inserting open slit 88 in the airbag 85 after it has passed through the passage hole 24a in the case 17.

Consequently, according to the knee protection airbag device S of the embodiment, the inflator 64 can be mounted on the case 17 after the folded airbag 85 has been housed within the case 17, and there is provided good workability in mounting the inflator 64.

In addition, in the knee protection airbag device S of the embodiment, the locking claw portion 74 is provided at the front end so as to be substantially symmetrical with the bolt part 75 with respect to the opening center (the through hole 88b) of the inserting open slit 88 which functions as the center of the point symmetry such that the locking claw portion is projected on to the open plane of the inserting open slit 88 (the cross section of the retaining part 70 taken along the direction which intersects the axial direction thereof at right angles), when the retainer 69 is housed within the airbag 85 in such a manner that the bolt parts 75 protrude therefrom. Namely, in the knee protection airbag device S of the embodiment, since the inserting open slit 88 in the airbag 85 is retained by the locking claw portion 74 and the bolt part 75 at the two positions on the forward and rearward sides thereof which become symmetrical with each other with respect to the center of the through hole 88b which functions as the center of the point symmetry, even though the inflator 64 hits the circumferential edge of the inserting open slit 88 when the inflator 64 is inserted, the circumferential edge of the inserting open slit 88 is made hard to deviate, whereby the opening center of the inserting open slit 88 and the center of the inflator inserting opening 70b of the retaining part 70 can be aligned with each other, so that the inflator 64 can be inserted into the interior of the retaining part 70 more smoothly. Of course, in the event that this advantage is not taken into consideration, a configuration may be adopted in which the locking claw portion is provided at a position which lies on an upper or lower edge of the opening slit.

In addition, in the airbag device S of the embodiment, the through hole 89 is provided in the airbag 85 which enables the passage of the support projection 30 formed on the case bottom wall portion 29. Namely, in the airbag device S of the embodiment, since the support projection 30 is brought into direct abutment with the outer circumferential surface of the inflator 64 without the base fabric making up the airbag 85 interposed therebetween, the support projection 30 is free from the effect of aging of the base fabric making up the airbag 85, thereby making it possible to stabilize the tightening force of the nuts 76, whereby the inflator 64 can be stably retained by the retainer 69. Note that in the event of the airbag device S of the embodiment, while the airbag 85 is not tightened between the case bottom wall portion 29 and the retaining part 70 of the retainer 69 when the nuts 76 are fastened, the airbag 85 is retained by the retainer 69 at the positions on the retaining part 70 of the retainer 69 which lie on the circumferential edges of the bolt parts 75, so as to be fixed to the case main body portion 18.

In addition, in the knee protection airbag device of the embodiment, while the inserting open slit 88 in the airbag 85 is formed into the slit shape, the shape of the inserting open slit 88 is not, of course, limited thereto, and hence, a hole opened into a circular shape so as to enable the insertion of the inflator may be provided as the inserting open slit. In the event that the inserting open slit 88 is formed into the slit shape as with the embodiment, the workability at the time of production is improved, and in the event that the inserting open slit 88 is provided in the direction extending along a deployment direction of the airbag 85 as in the event of the airbag device S of the embodiment, since a tensile force that is generated in the vicinity of the inserting open slit 88 at the time of deployment of the airbag 85 acts in a direction which closes the inserting open slit 88, increasing the sealing properties, the inserting opening slit 88 in this embodiment is formed into a slit-shape. However, it is not limited to the slit shape. The inserting opening slit is preferably provided so as to extend along the direction in which the airbag is deployed.

What is claimed is:

1. A method of assembling an airbag device including a folded airbag, an inflator having a substantially cylinder shape for supplying a gas to the airbag, and a case made of a sheet metal in which the airbag and the inflator are housed, and a retainer made of a sheet metal including a retaining part having a substantially cylindrical shape in which the inflator is provided and a bolt part protruding perpendicularly to an axial direction of the retaining part, comprising the steps of:
    housing the retainer in the airbag in a folded state such that the bolt part protrudes from the airbag;
    housing the airbag in the case;
    passing the bolt part through a passage hole formed on a fixing wall portion of the case;
    fastening a nut onto the bolt part to fix the retainer to the fixing wall portion, wherein the inflator is retained by the retainer substantially at the same time that the retainer is fixed to the fixing wall portion; and retaining the inflator only by a support projection formed on the fixing wall portion and an abutment portion in the retainer such that the support projection prevents the inflator from being in contact with an inner face of the retainer.

2. A method of assembling an airbag device, according to claim 1, further comprising the steps of:

folding the airbag such that the retaining part of the retainer is housed therein while a locking claw portion is protruded at an axial end of the retaining part;

housing the airbag in the case;

locking the locking claw portion at a circumferential edge of an insertion hole of the airbag to thereby substantially align a center axis of an inflator insertion opening of the retaining part with a center axis of the insertion hole of the airbag; and inserting the inflator into the airbag from the insertion hole of the airbag through a passage hole in the case.

3. A method of assembling an airbag device, according to claim 1, further comprising the steps of:

providing a dislodgement preventing member having a securing plate portion, a locking hook formed on the securing plate portion and a fixing portion continuous from the securing plate portion;

inserting the locking hook in an opening on a side of the retainer; and securing the fixing portion to the case by fastening the nut onto the bolt part such that the securing plate portion secures an end of the inflator.

4. An airbag device comprising:

a folded airbag;

an inflator having a substantially cylinder shape for supplying a gas to the airbag;

a case made of a sheet metal in which the airbag and the inflator are housed; and a retainer made of a sheet metal including a retaining part having a substantially cylindrical shape in which the inflator is provided and a bolt part protruding perpendicularly to an axial direction of the retaining part;

wherein the retainer is housed in the airbag in a folded state such that the bolt part protrudes from the airbag;

the airbag having the retainer therein is housed in the case, the bolt part is passed through a passage hole formed on a fixing wall portion of the case, and a nut is fastened onto the bolt part to fix the retainer to the fixing wall portion, wherein the inflator is retained by the retainer substantially at the same time that the retainer is fixed to the fixing wall portion, wherein a support projection protruding toward the inflator is formed on the fixing wall portion at a position deviated in an axial direction of the inflator from the passage hole, when the retaining part is moved toward the fixing wall portion by fastening the nut, the inflator is fixed to the fixing wall portion by clamping a part of the inflator between an abutment portion formed in the retaining part and the support projection when the nut is fastened, and the inflator is retained only by the support projection and the abutment portion such that the support projection prevents the inflator from being in contact with an inner face of the retainer.

5. An airbag device according to claim 4, wherein the abutment portion is one of a pair of abutment portions formed along a circumference of the retaining part in a cross section perpendicular to an axial direction of the retaining part, such that the abutment portions are opposed to the bolt part.

6. An airbag device according to claim 4, wherein the bolt part is one of a pair of bolt parts provided along the axial direction of the retaining part, the passage hole is one of a pair of passage holes on the fixing wall portion, and the support projection is provided so as to be located between the pair of passage holes on the fixing wall portion.

7. An airbag device comprising:

a folded airbag;

an inflator having a substantially cylinder shape for supplying a gas to the airbag;

a case made of a sheet metal in which the airbag and the inflator are housed; and a retainer made of a sheet metal including a retaining part having a substantially cylindrical shape in which the inflator is provided and a bolt part protruding perpendicularly to an axial direction of the retaining part;

wherein the retainer is housed in the airbag in a folded state such that the bolt part protrudes from the airbag;

the airbag in which the retainer is housed is housed in the case, the bolt part is passed through a passage hole formed on a fixing wall portion of the case, and a nut is fastened onto the bolt part to fix the retainer to the fixing wall portion, wherein the inflator is retained by the retainer substantially at the same time that the retainer is fixed to the fixing wall portion; and wherein the airbag is folded such that the retaining part of the retainer is housed therein while a locking claw portion is protruded at an axial end of the retaining part;

the airbag is housed in the case;

the locking claw portion is locked at a circumferential edge of an insertion hole of the airbag to thereby substantially align a center axis of an inflator insertion opening of the retaining part with a center axis of the insertion hole of the airbag; and the inflator is inserted into the airbag from the insertion hole of the airbag through a passage hole in the case.

8. An airbag device according to claim 7, wherein the locking claw portion is provided at a position substantially symmetrical with the bolt part around a center of the insertion hole as center of point symmetry in a state that the retainer is housed within the airbag, when the locking claw portion and the bolt portion are projected onto a common plane perpendicular to the axial direction of the inflator.

9. An airbag device comprising:

a folded airbag;

an inflator having a substantially cylinder shape for supplying a gas to the airbag;

a case made of a sheet metal in which the airbag and the inflator are housed; and a retainer made of a sheet metal including a retaining part having a substantially cylindrical shape in which the inflator is provided and a bolt part protruding perpendicularly to an axial direction of the retaining part, wherein the inflator and the retainer are housed in the airbag such that the bolt part protrudes from the airbag and passes through a passage hole on a fixing wall portion of the case, a nut is fastened onto the bolt part to thereby fix the airbag and the inflator to the fixing wall portion, a support projection protruding toward the inflator is formed on the fixing wall portion at a position deviated in an axial direction of the inflator from the passage hole, and when the retaining part is moved toward the fixing wall portion by fastening the nut, the inflator is fixed to the fixing wall portion while clamping a part of the inflator between an abutment portion of the retaining part and the support projection, and the inflator is retained only by the support projection and the abutment portion such that the support projection prevents the inflator from being in contact with an inner face of the retainer.

10. An airbag device according to claim 9, wherein the abutment portion is one of a pair of abutment portions formed along a circumference of the retaining part in a cross section perpendicular to an axial direction of the retaining part, such that the abutment portions are opposed to the bolt part.

11. An airbag according to claim 9, wherein the bolt part is one of a pair of bolt parts provided along the axial direction of the retaining part, and the support projection is provided so as to be located between a pair of the passage holes on the fixing wall portion.

12. An airbag device comprising:

a folded airbag;

an inflator of a substantially cylinder shape, having a gas discharge port provided at a first end thereof for supplying a gas to the airbag and a part to which a connector connected to an airbag activation circuit through a lead wire is mounted at a second end thereof, wherein the inflator is housed within the case such that a bolt part provided on a retainer passes through a fixing wall portion of the case and the second end of the inflator protrudes from a passage hole formed in the case and then the inflator is fixed to the case with the retainer when a nut is fastened onto the bolt part;

a case made of a sheet metal in which the airbag and the inflator are housed; and a dislodgement preventing member is provided on an outer side of the case for securing the first end of the inflator protruding from the passage hole so as to prevent a dislodgement of the inflator from the case, the dislodgement preventing member including:

a securing plate portion which extends perpendicularly to an axial direction of the inflator for securing the first end of the inflator and which includes an opening through which the connector is connected to the inflator, and a fixing portion continuous from the securing plate portion extending along the axial direction of the inflator for being fixed to the case when the nut is fastened onto the bolt part; and a locking hook provided on the securing plate portion for being locked on the case so as to suppress a movement of the securing plate portion in the axial direction of the inflator.

13. An airbag device according to claim 12, wherein the dislodgement preventing member is formed from a sheet metal, and wherein an opening into which the locking hook is inserted is located such that the locking hook is brought into press contact with a wall portion on an inner surface of the case.

14. An airbag device comprising:

a folded airbag;

an inflator having a substantially cylinder shape for supplying a gas to the airbag;

a case made of a sheet metal in which the airbag and the inflator are housed; and a retainer made of a sheet metal including a retaining part having a substantially cylindrical shape in which the inflator is provided and a bolt part protruding perpendicularly to an axial direction of the retaining part;

wherein the airbag is folded to house the retainer that is inserted through an insertion hole on the airbag and a passage hole on the case, and wherein a locking claw portion protruded at an axial end of the retaining part is locked at a circumferential edge of the insertion hole of the airbag when the airbag is housed within the case to thereby substantially align a center axis of an inflator insertion opening of the retaining part with a center axis of the insertion hole.

15. An airbag device according to claim 14, wherein the locking claw portion is provided at a position substantially symmetrical with the bolt part around a center of the insertion hole as center of point symmetry in a state that the retainer is housed within the airbag, when the locking claw portion and the bolt portion are projected onto a common plane perpendicular to the axial direction of the inflator.

* * * * *